(12) United States Patent
Khoshnevisan et al.

(10) Patent No.: US 12,557,096 B2
(45) Date of Patent: Feb. 17, 2026

(54) CODE BLOCK GROUP-BASED TRANSMISSIONS FOR MULTI-CODEWORD CHANNELS

(71) Applicant: QUALCOMM Incorporated, San Diego, CA (US)

(72) Inventors: Mostafa Khoshnevisan, San Diego, CA (US); Jing Sun, San Diego, CA (US); Ahmed Abdelaziz Ibrahim Abdelaziz Zewail, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/827,299

(22) Filed: May 27, 2022

(65) Prior Publication Data

US 2023/0389017 A1    Nov. 30, 2023

(51) Int. Cl.
*H04W 72/00* (2023.01)
*H04B 7/0417* (2017.01)
(Continued)

(52) U.S. Cl.
CPC ...... *H04W 72/1273* (2013.01); *H04B 7/0417* (2013.01); *H04L 5/001* (2013.01); *H04W 72/0453* (2013.01); *H04W 72/23* (2023.01)

(58) Field of Classification Search
None
See application file for complete search history.

(56) References Cited

U.S. PATENT DOCUMENTS 8,942,080 B2 *  1/2015  Shen ............... H04L 1/1692
                                              370/208
11,245,496 B2 * 2/2022  Peng ............... H04W 72/23
(Continued)

FOREIGN PATENT DOCUMENTS

EP          3664338 A1      6/2020
WO      WO-2018137584 A1 *  8/2018  .......... H04L 1/16

OTHER PUBLICATIONS

CATT: "Discussion on Reliability Improvement Mechanism for RRC_Connected UEs in MBS", 3GPP TSG RAN WG1 #108-e, R1-2201339, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 21, 2022-Mar. 3, 2022, Feb. 14, 2022, XP052109398, 6 pages, p. 13, figure 8.
(Continued)

*Primary Examiner* — Gerald A Smarth
(74) *Attorney, Agent, or Firm* — Holland & Hart LLP

(57) ABSTRACT

Methods, systems, and devices for wireless communications are described. In some systems, a user equipment (UE) may receive a grant of resources scheduling a first transport block and a second transport block during a reception occasion on a component carrier. The UE may receive the first transport block and the second transport block during the reception occasion. The UE may transmit a feedback message associated with hybrid automatic repeat request feedback. The feedback message may include a first quantity of feedback bits for the first transport block and a second quantity of feedback bits for the second transport block, where the first quantity of feedback bits is different from the second quantity of feedback bits.

24 Claims, 19 Drawing Sheets

(51) Int. Cl.
*H04L 5/00* (2006.01)
*H04W 72/0453* (2023.01)
*H04W 72/1273* (2023.01)
*H04W 72/23* (2023.01)

(56) References Cited

U.S. PATENT DOCUMENTS

| | | | | |
|---|---|---|---|---|
| 2018/0198567 A1* | 7/2018 | Huss | ................. | H04L 5/001 |
| 2020/0220663 A1* | 7/2020 | Tsai | ................. | H04L 1/1822 |
| 2020/0259599 A1* | 8/2020 | Zhang | ................. | H04L 1/1864 |
| 2021/0092759 A1* | 3/2021 | Xiong | ............... | H04W 72/0446 |
| 2022/0039029 A1* | 2/2022 | Zhang | ................. | H04W 72/21 |

OTHER PUBLICATIONS

Huawei, et al., "Intra-UE Multiplexing Enhancements", 3GPP TSG RAN WG1 Meeting #107-e, R1-2110819, 3rd Generation Partnership Project (3GPP), Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, XP052074600, 18 pages, p. 3.
International Search Report and Written Opinion—PCT/US2023/067099—ISA/EPO—Sep. 5, 2023 (2203760WO).

* cited by examiner

CODE BLOCK GROUP-BASED TRANSMISSIONS FOR MULTI-CODEWORD CHANNELS

FIELD OF TECHNOLOGY

The following relates to wireless communications, including code block group-based transmissions for multi-codeword channels.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support code block group (CBG) based transmissions for multi-codeword channels. For example, the described techniques provide for a communication device (e.g., a user equipment (UE)) and a network entity to support enhanced feedback for a physical downlink shared channel (PDSCH) including multiple transport blocks. For example, the UE may receive multiple transport blocks communicated via a single PDSCH occasion, and may report feedback for a first transport block including a first quantity of feedback bits, and feedback for a second transport block including a second quantity of bits. For example, the UE may send transport block-based feedback with one bit for the first transport block and CBG-based feedback with a quantity of bits (e.g., a quantity of bits equal to a quantity of CBGs configured per transport block) for the second transport block. In some examples, the UE may transmit CBG-based feedback for both transport blocks received in a PDSCH occasion, but may be configured to provide a first quantity of feedback bits (e.g., according to a first configured threshold quantity of CBGs) for the first transport block and a second quantity of feedback bits (e.g., according to a second configured threshold quantity of CBGs) for the second transport block.

A method for wireless communications at a user equipment (UE) is described. The method may include receiving a grant of resources scheduling a first transport block and a second transport block during a reception occasion on a component carrier, receiving the first transport block and the second transport block during the reception occasion, and transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits.

An apparatus for wireless communications at a UE is described. The apparatus may include a processor, memory coupled with the processor, and instructions stored in the memory. The instructions may be executable by the processor to cause the apparatus to receive a grant of resources scheduling a first transport block and a second transport block during a reception occasion on a component carrier, receive the first transport block and the second transport block during the reception occasion, and transmit a feedback message associated with hybrid automatic repeat request feedback and including a first quantity of feedback bits for the first transport block and a second quantity of feedback bits for the second transport block, where the first quantity of feedback bits is different from the second quantity of feedback bits.

Another apparatus for wireless communications at a UE is described. The apparatus may include means for receiving a grant of resources scheduling a first transport block and a second transport block during a reception occasion on a component carrier, means for receiving the first transport block and the second transport block during the reception occasion, and means for transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits.

A non-transitory computer-readable medium storing code for wireless communications at a UE is described. The code may include instructions executable by a processor to receive a grant of resources scheduling a first transport block and a second transport block during a reception occasion on a component carrier, receive the first transport block and the second transport block during the reception occasion, and transmit a feedback message associated with hybrid automatic repeat request feedback and including a first quantity of feedback bits for the first transport block and a second quantity of feedback bits for the second transport block, where the first quantity of feedback bits is different from the second quantity of feedback bits.

Some examples of the method, apparatuses, and non-transitory computer-readable medium described herein may further include operations, features, means, or instructions for receiving control signaling including an indication of transport block level feedback including the first quantity of feedback bits for the first transport block, and CBG level feedback including the second quantity of feedback bits for the second transport block, the first quantity of feedback bits including one feedback bit, and the second quantity of feedback bits including more than one feedback bit associated with a threshold quantity of CBGs.

Some examples of the method, apparatuses, and non-transitory computer-readable medium described herein may further include operations, features, means, or instructions for mapping the first quantity of feedback bits to the first transport block and the second quantity of feedback bits to the second transport block based on a comparison between a first value of one or more parameters of the first transport block with a second value of the one or more parameters of the second transport block, the one or more parameters including a transport block size, a quantity of codebooks, a modulation and coding scheme, a transmission rank, an identifier order in the grant of resources, or a combination thereof.

Some examples of the method, apparatuses, and non-transitory computer-readable medium described herein may further include operations, features, means, or instructions for generating a first portion of the feedback message including the one feedback bit associated with the first transport block according to a first sub-codebook associated with transport block level feedback and generating a second portion of the feedback message including the second quantity of feedback bits associated with the second transport block according to a second sub-codebook associated with CBG level feedback.

Some examples of the method, apparatuses, and non-transitory computer-readable medium described herein may further include operations, features, means, or instructions for receiving, in the grant of resources, a first set of downlink assignment indices associated with the first sub-codebook and a second set of downlink assignment indices associated with the second sub-codebook, where generating the first portion of the feedback message may be based on the first set of downlink assignment indices and generating the second portion of the feedback message may be based on the second set of downlink assignment indices.

Some examples of the method, apparatuses, and non-transitory computer-readable medium described herein may further include operations, features, means, or instructions for generating a first portion of the feedback message including the one feedback bit associated with the first transport block and the second quantity of feedback bits associated with the second transport block according to a first sub-codebook with CBG level feedback.

Some examples of the method, apparatuses, and non-transitory computer-readable medium described herein may further include operations, features, means, or instructions for receiving, in the grant of resources, a set of downlink assignment indices for the first sub-codebook and a second sub-codebook with transport block level feedback, where each downlink assignment index position associated with a respective downlink assignment index of the set of downlink assignment indices may be associated with a quantity of feedback bits greater than or equal to a sum of the first quantity of feedback bits and the second quantity of feedback bits.

In some examples of the method, apparatuses, and non-transitory computer-readable medium described herein, each downlink assignment index position associated with a respective downlink assignment index of the set of downlink assignment indices may be associated with the quantity of feedback bits that may be based on a threshold quantity of feedback bits supported across a set of multiple component carriers including the component carrier.

Some examples of the method, apparatuses, and non-transitory computer-readable medium described herein may further include operations, features, means, or instructions for generating the feedback message according to a feedback codebook including a total quantity of feedback bits corresponding to a set of multiple reception occasions on the component carrier.

In some examples of the method, apparatuses, and non-transitory computer-readable medium described herein, where each of the set of multiple reception occasions corresponds to a subset of the total quantity of feedback bits equal to a product of two and a threshold quantity of CBGs.

In some examples of the method, apparatuses, and non-transitory computer-readable medium described herein, where each of the set of multiple reception occasions corresponds to a subset of the total quantity of feedback bits equal to a sum of the first quantity of feedback bits and the second quantity of feedback bits.

Some examples of the method, apparatuses, and non-transitory computer-readable medium described herein may further include operations, features, means, or instructions for generating the feedback message according to a feedback codebook including a total quantity of feedback bits corresponding to a set of multiple feedback process identifiers, where each of the set of multiple feedback process identifiers corresponds to a subset of the total quantity of feedback bits equal to a sum of the first quantity of feedback bits and the second quantity of feedback bits.

Some examples of the method, apparatuses, and non-transitory computer-readable medium described herein may further include operations, features, means, or instructions for receiving control signaling including an indication of the first quantity of feedback bits for the first transport block and the second quantity of feedback bits for the second transport block, where the second quantity of feedback bits may be greater than the second quantity of feedback bits.

Some examples of the method, apparatuses, and non-transitory computer-readable medium described herein may further include operations, features, means, or instructions for mapping the first quantity of feedback bits to the first transport block and the second quantity of feedback bits to the second transport block based on a comparison between a value of one or more parameters of the first transport block with a respective value of the one or more parameters of the second transport block, the one or more parameters including a transport block size, a quantity of codebooks, a modulation and coding scheme, a transmission rank, an identifier order in the grant of resources, or a combination thereof.

Some examples of the method, apparatuses, and non-transitory computer-readable medium described herein may further include operations, features, means, or instructions for generating a first portion of the feedback message including the first quantity of feedback bits associated with the first transport block and the second quantity of feedback bits associated with the second transport block according to a sub-codebook with CBG level feedback.

Some examples of the method, apparatuses, and non-transitory computer-readable medium described herein may further include operations, features, means, or instructions for receiving, in the grant of resources, a set of downlink assignment indices for the sub-codebook, where each downlink assignment index position associated with a respective downlink assignment index of the set of downlink assignment indices may be associated with a quantity of feedback bits equal to a sum of the first quantity of feedback bits and the second quantity of feedback bits.

A method for wireless communications at a network entity is described. The method may include outputting, a grant of resources scheduling a first transport block and a second transport block during a reception occasion on a component carrier, obtaining the first transport block and the second transport block during the reception occasion based on receiving the grant of resources, and obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits.

An apparatus for wireless communications at a network entity is described. The apparatus may include a processor, memory coupled with the processor, and instructions stored in the memory. The instructions may be executable by the processor to cause the apparatus to outputting, a grant of resources schedule a first transport block and a second transport block during a reception occasion on a component carrier, obtain the first transport block and the second transport block during the reception occasion based on receiving the grant of resources, and obtain a feedback message associated with hybrid automatic repeat request feedback and including a first quantity of feedback bits for the first transport block and a second quantity of feedback bits for the second transport block, where the first quantity of feedback bits is different from the second quantity of feedback bits.

Another apparatus for wireless communications at a network entity is described. The apparatus may include means for outputting, a grant of resources scheduling a first transport block and a second transport block during a reception occasion on a component carrier, means for obtaining the first transport block and the second transport block during the reception occasion based on receiving the grant of resources, and means for obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits.

A non-transitory computer-readable medium storing code for wireless communications at a network entity is described. The code may include instructions executable by a processor to outputting, a grant of resources schedule a first transport block and a second transport block during a reception occasion on a component carrier, obtain the first transport block and the second transport block during the reception occasion based on receiving the grant of resources, and obtain a feedback message associated with hybrid automatic repeat request feedback and including a first quantity of feedback bits for the first transport block and a second quantity of feedback bits for the second transport block, where the first quantity of feedback bits is different from the second quantity of feedback bits.

Some examples of the method, apparatuses, and non-transitory computer-readable medium described herein may further include operations, features, means, or instructions for outputting control signaling including an indication of transport block level feedback including the first quantity of feedback bits for the first transport block, and CBG level feedback including the second quantity of feedback bits for the second transport block, the first quantity of feedback bits including one feedback bit, and the second quantity of feedback bits including more than one feedback bit associated with a threshold quantity of CBGs.

Some examples of the method, apparatuses, and non-transitory computer-readable medium described herein may further include operations, features, means, or instructions for decoding a first portion of the feedback message including the one feedback bit associated with the first transport block according to a first sub-codebook associated with transport block level feedback and decoding a second portion of the feedback message including the second quantity of feedback bits associated with the second transport block according to a second sub-codebook associated with CBG level feedback.

Some examples of the method, apparatuses, and non-transitory computer-readable medium described herein may further include operations, features, means, or instructions for outputting, in the grant of resources, a first set of downlink assignment indices associated with the first sub-codebook and a second set of downlink assignment indices associated with the second sub-codebook, where decoding the first portion of the feedback message may be based on the first set of downlink assignment indices and decoding the second portion of the feedback message may be based on the second set of downlink assignment indices.

Some examples of the method, apparatuses, and non-transitory computer-readable medium described herein may further include operations, features, means, or instructions for decoding a first portion of the feedback message including the one feedback bit associated with the first transport block and the second quantity of feedback bits associated with the second transport block according to a first sub-codebook with CBG level feedback.

Some examples of the method, apparatuses, and non-transitory computer-readable medium described herein may further include operations, features, means, or instructions for outputting, in the grant of resources, a set of downlink assignment indices for the first sub-codebook and a second sub-codebook with transport block level feedback, where each downlink assignment index position associated with a respective downlink assignment index of the set of downlink assignment indices may be associated with a quantity of feedback bits greater than or equal to a sum of the first quantity of feedback bits and the second quantity of feedback bits.

In some examples of the method, apparatuses, and non-transitory computer-readable medium described herein, each downlink assignment index position associated with a respective downlink assignment index of the set of downlink assignment indices may be associated with the quantity of feedback bits that may be based on a threshold quantity of feedback bits supported across a set of multiple component carriers including the component carrier.

Some examples of the method, apparatuses, and non-transitory computer-readable medium described herein may further include operations, features, means, or instructions for outputting control signaling including an indication of the first quantity of feedback bits for the first transport block and the second quantity of feedback bits for the second transport block, where the second quantity of feedback bits may be greater than the second quantity of feedback bits.

Some examples of the method, apparatuses, and non-transitory computer-readable medium described herein may further include operations, features, means, or instructions for decoding a first portion of the feedback message including the first quantity of feedback bits associated with the first transport block and the second quantity of feedback bits associated with the second transport block according to a sub-codebook with CBG level feedback.

Some examples of the method, apparatuses, and non-transitory computer-readable medium described herein may further include operations, features, means, or instructions for outputting, in the grant of resources, a set of downlink assignment indices for the sub-codebook, where each downlink assignment index position associated with a respective downlink assignment index of the set of downlink assignment indices may be associated with a quantity of feedback bits equal to a sum of the first quantity of feedback bits and the second quantity of feedback bits.

DETAILED DESCRIPTION

Figure 1:
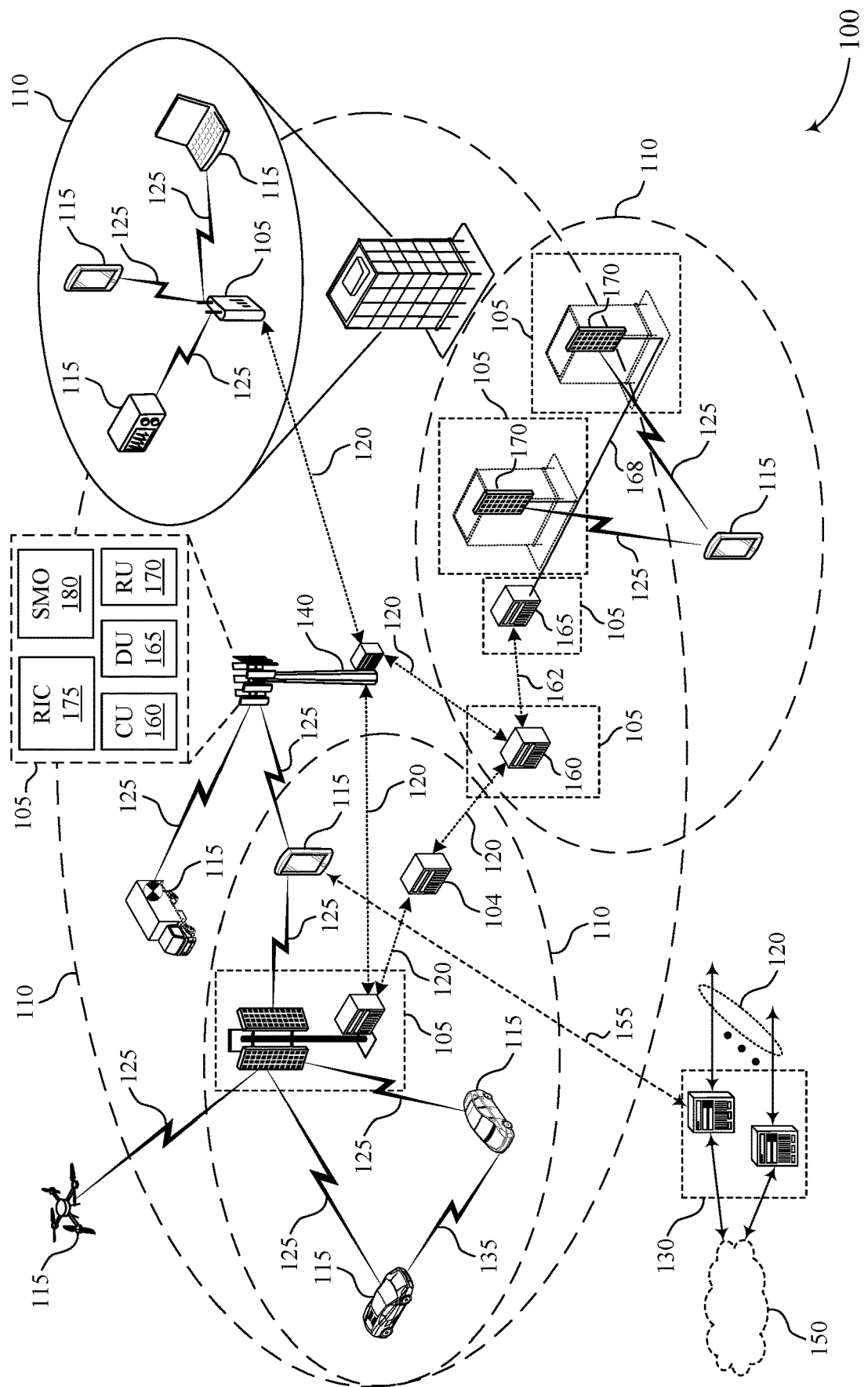
FIG. 1 illustrates an example of a wireless communications system that supports code block group (CBG) based transmissions for multi-codeword channels in accordance with one or more aspects of the present disclosure.

In a wireless communications system, a user equipment (UE) may receive downlink signaling, including one or more transport blocks, and may provide hybrid automatic repeat request (HARQ) feedback. A transport block may include multiple CBGs, and a CBG may include one or more code blocks. The HARQ feedback may be provided on a transport block level (e.g., a single bit indicating whether a transport block is successfully received) or a code block group (CBG) level (e.g., a set of bits indicating whether individual CBGs of a transport block have been successfully received). Upon receiving CBG level feedback, the network entity may retransmit CBGs corresponding to code blocks that the UE received in error.

The network device may send one or more transmit blocks on a single physical downlink shared channel (PDSCH) occasion, and may transmit the transmit blocks using one or more layers. If the network entity schedules resources on which to transmit using more than four layers, then the network entity may transmit a DCI message scheduling two transport blocks communicated via the same PDSCH occasion. Because a different modulation coding scheme (MCS) or a different quantity of layers per PDSCH occasion may result in different transport block sizes, each transport block may include a different quantity of code blocks. However, if the UE is configured to provide CBG level feedback, and is configured with a single threshold quantity of CBGs, then the UE may provide CBG-level feedback for both transport blocks (e.g., a same quantity of feedback bits for each transport block), despite the two transport blocks having different parameter values (e.g., different sizes, different MCSs, different quantities of code blocks, etc.). In such examples, the UE may not be configured to transmit CBG-based HARQ feedback for a first transport block and transport block-based feedback for a second transport block. Similarly, the UE may not be configured to transmit CBG-based feedback for two transport blocks according to different threshold quantities of CBGs (e.g., using different granularities and different quantities of bits). However, transmitting feedback using a same granularity (e.g., a same quantity of CBGs for each TB) may result in unnecessary signaling overhead, unnecessarily triggering retransmissions, inefficient use of computational resources and system resources, and increased system latency.

Techniques described herein support enabling a UE and a network entity to support enhanced CBG-based feedback for a PDSCH occasions including multiple transport blocks, to support higher data rates and spectral efficiency. For example, the described techniques in which the UE may receive multiple transport blocks communicated via a single PDSCH occasion, and may report feedback for a first transport block including a first quantity of feedback bits, and feedback for a second transport block including a second quantity of bits. For example, the UE may be configured (e.g., via higher layer signaling) to send transport block-based feedback with one bit for the first transport block and CBG-based feedback with a quantity of bits (e.g., a quantity of bits equal to a quantity of CBGs configured per transport block) for the second transport block. In some examples, the UE may be configured with two threshold quantities of CBGs, and may transmit CBG-based feedback for both transport blocks received in a PDSCH occasion, but may be configured to provide a first quantity of feedback bits (e.g., according to a first configured threshold quantity of CBGs) for the first transport block and a second quantity of feedback bits (e.g., according to a second configured threshold quantity of CBGs) for the second transport block.

In some examples, the UE may generate and send transport block-based HARQ feedback with one bit for a first transport block and CBG-based HARQ feedback with N bits (N=maximum quantity of CBGs per transport block) for a second transport block. The value of N may be configured by radio resource control (RRC) signaling. Additionally or alternatively, the UE may transmit CBG-based feedback based on being configured such that a first transport block has a maximum number of N1 CBGs (N1=maximum quantity of CBGs for the first transport block) and a second transport block has a maximum number of N2 CBGs (N2=maximum quantity of CBGs for second first transport block), where N2 is greater than N1. The values for N1 and N2 may be configured by RRC signaling. In both proposals, the UE may determine the first transport block and the second transport block based on one or more parameters (e.g., MCS values, size, ordering, etc.).

Aspects of the disclosure are initially described in the context of wireless communications systems. Aspects of the disclosure are further illustrated by and described with reference to mapping schemes and a process flow. Aspects of the disclosure are further illustrated by and described with reference to apparatus diagrams, system diagrams, and flowcharts that relate to CBG-based transmissions for multi-codeword channels.

FIG. 1 illustrates an example of a wireless communications system 100 that supports code block group-based transmissions for multi-codeword channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support CBG-based transmissions for multi-codeword channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some aspects, a UE 115 may receive one or more transport blocks, or code words, via a PDSCH. The transport blocks may be communicated via one or multiple spatial layers, where v may indicate the quantity of spatial layers. If the UE 115 is scheduled to receive a PDSCH transmission using four or less layers (e.g., v≤4), the UE 115 may receive one transport block on the PDSCH. If the UE 115 is scheduled to receive a PDSCH transmission using more than four layers (e.g., v>4), the UE 115 may map the layers to multiple transport blocks and receive the multiple transport blocks on the PDSCH. For example, if the UE 115 is scheduled to receive a PDSCH with v>4, a radio resource control (RRC) parameter (e.g., maxNrofCodeWordsScheduledByDCI) may configure the UE 115 with a threshold quantity of transport blocks to be scheduled by downlink control information (DCI). Based on the RRC parameter, the UE 115 may receive DCI scheduling up to the threshold quantity of transport blocks.

In some examples, the wireless communications system 100 may support rate splitting multi-user MIMO (MU-MIMO) techniques to support greater capacity and a larger degree of freedom of communications received at multiple UEs 115. For example, a network entity 105 may serve multiple UEs 115. In some cases, the network entity 105 may encode each message individually to transmit each message to the respective UE 115. However, by utilizing rate splitting MU-MIMO technology, the network entity 105 may encode and transmit a reduced quantity of transmissions to the UEs 115, reducing signaling overhead. For each UE 115 of multiple co-scheduled UEs 115, a network entity 105 may schedule a common transport block and a private transport block on a PDSCH. The common transport block transmitted to each UE 115 may include a common message that includes information for multiple UEs 115. Accordingly, each of the UEs 115 may decode the same common transport block. In contrast to the common transport block, the private transport block transmitted to each UE 115 may be specific to each UE 115. Accordingly, each UE 115 may decode the specific private transport block respective to each UE 115. Because multiple UEs 115 may decode the common transport block, the common transport block may have a smaller MCS and a smaller rank than the private transport block decoded by each corresponding UE 115.

In such examples, where the wireless communications system 100 may support techniques for rate splitting (e.g., in MU-MIMO communications), such techniques may result in larger degree of freedom and capacity for communications. In such examples, messages for individual UEs 115 may be split into common and private parts. Common parts of individual messages of two or more UEs 115 may be concatenated into a common message, encoded and modulated to a common stream (e.g., which may have one or more layers). The common stream may be precoded by precoder, and transmitted by transmitter antennas (e.g., from one transmit/receive point (TRP) or network entity 105 or multiple TRPs in a CoMP scenario). The private part of the individual messages (e.g., tow private parts of individual messages for two respective UEs 115) may be separately encoded and modulated to private streams for corresponding UEs 115. Private streams may be precoded by two precoders, respectively, and transmitted by transmitter antennas from one TRP or network entity 105, or multiple TRPs in CoMP scenarios. The encoding process may include modulation and mapping to one or more layers in addition to encoding.

A UE 115 may first decode the common message. Some part of the individual message for the UE 115 may be embedded in the common message, which may be data intended for the receiving UE 115. Thus, the UE 115 may assist decoding of the private message by decoding the common message. Additionally, or alternatively, the UE 115 may use the decoded common message for successive interference cancelation while decoding the private message. For example, the UE 115 may estimate an effective channel corresponding to a common stream, and may decode the common message, re-encode the common stream, and multiply the re-encoded common stream by the estimated effective channel, and subtract from the received signal. The UE may then decode the private message based thereon.

The UE 115 may receive one or more transport blocks that each include multiple CBGs, and each CBG of the one or more transport blacks may include one or more code blocks. In some aspects, an RRC parameter (e.g., codeBlockGroupTranmission) in a downlink serving cell may configure enablement or disablement of the CBG feature for transmissions received by the UE 115 and apply the CBG feature to all bandwidth parts (BWPs) of the cell associated with the UE 115. As described herein, the downlink serving cell may refer to any cell with which the UE 115 is actively connected to or with which the UE 115 exchanges data or control signaling. In some examples, an RRC parameter (e.g., maxCodeBlockGroupsPerTransportBlock) may configure the UE 115 with a threshold quantity of CBGs per transport block. If the UE 115 is configured to receive one transport block (e.g., single-TB case), the RRC parameter may configure the UE 115 with a threshold quantity of 2, 4, 6, or 8 CBGs per transport block. Accordingly, the UE 115 may be configured to receive no more than 8 CBGs per transport block in the single-TB case (e.g., v≤4). If the UE 115 is configured to receive two transport blocks (e.g., multi-TB case, for maxNrofCodeWordsScheduledByDCI=2) the RRC parameter may configure the UE 115 with a threshold quantity of 2 or 4 CBGs per transport block. Accordingly, the UE 115 may be configured to receive no more than 4 CBGs per transport block in the multi-TB case (e.g., v>4).

In response to receiving one or more transport blocks on a PDSCH, the UE 115 may indicate HARQ feedback based on transport blocks or CBG. When a UE 115 is configured for CBG-based HARQ feedback, the UE 115 may feedback 1 bit acknowledgement (HARQ-ACK) per CBG. That is, the UE 115 may feedback 1 bit indicating ACK if the UE 115 correctly decodes all of the one or more code blocks in the CBG. Otherwise, the UE 115 may feedback 1 bit indicating negative acknowledgement NACK (e.g., if the UE 115 incorrectly decodes at least one of the one or more code blocks in the CBG). For instance, if the UE 115 receives a transport block including six CBGs, and the UE 115 incorrectly decodes a first code block in the second CBG and a second code block in the fifth CBG, the UE 115 may send CBG-based feedback indicating [ACK, NACK, ACK, ACK, NACK, ACK] for the six CBGs.

The network entity 105 may retransmit the CBGs from the previous transmission that are in error, or incorrectly decoded, in accordance with the CBG-based feedback indicated by the UE 115. In some examples, the UE 115 may receive DCI including downlink resource grants that the UE 115 may use to receive initial transmissions and retransmissions of the CBGs from the network entity 105. In such examples, the UE 115 may report a quantity of HARQ-ACK feedback bits per transport block that is equivalent to the threshold quantity of CBGs in the transport block. The downlink grants in the DCI may each include a CBG transmission information (CBGTI) field with bitwidth equivalent to the threshold quantity of CBGs per transport block, where the CBGTI field indicates which CBGs are retransmitted by the network entity 105. In some cases, transmitting feedback using a same granularity (e.g., a same quantity of CBGs for each TB) may result in unnecessary overhead, unnecessary retransmissions, inefficient use of computational resources and system resources, and increased system latency. Accordingly, CBG-based transmission of a PDSCH including multiple transport blocks may be enhanced.

In some implementations of the present disclosure, the UE 115 may employ enhanced CBG-based transmissions for multi-codeword channels (e.g., a PDSCH including multiple transport blocks). For example, the described techniques provide for a UE 115 and a network entity to support enhanced feedback for a PDSCH including multiple transport blocks. For example, the UE 115 may receive multiple transport blocks communicated via a single PDSCH occasion, and may report feedback for a first transport block including a first quantity of feedback bits, and feedback for a second transport block including a second quantity of bits. For example, the UE 115 may send transport block-based feedback with one bit for the first transport block and CBG-based feedback with a quantity of bits (e.g., a quantity of bits equal to a quantity of CBGs configured per transport block) for the second transport block. In some examples, the UE 115 may transmit CBG-based feedback for both transport blocks received in a PDSCH occasion, but may be configured to provide a first quantity of feedback bits (e.g., according to a first configured threshold quantity of CBGs) for the first transport block and a second quantity of feedback bits (e.g., according to a second configured threshold quantity of CBGs) for the second transport block.

Figure 2:
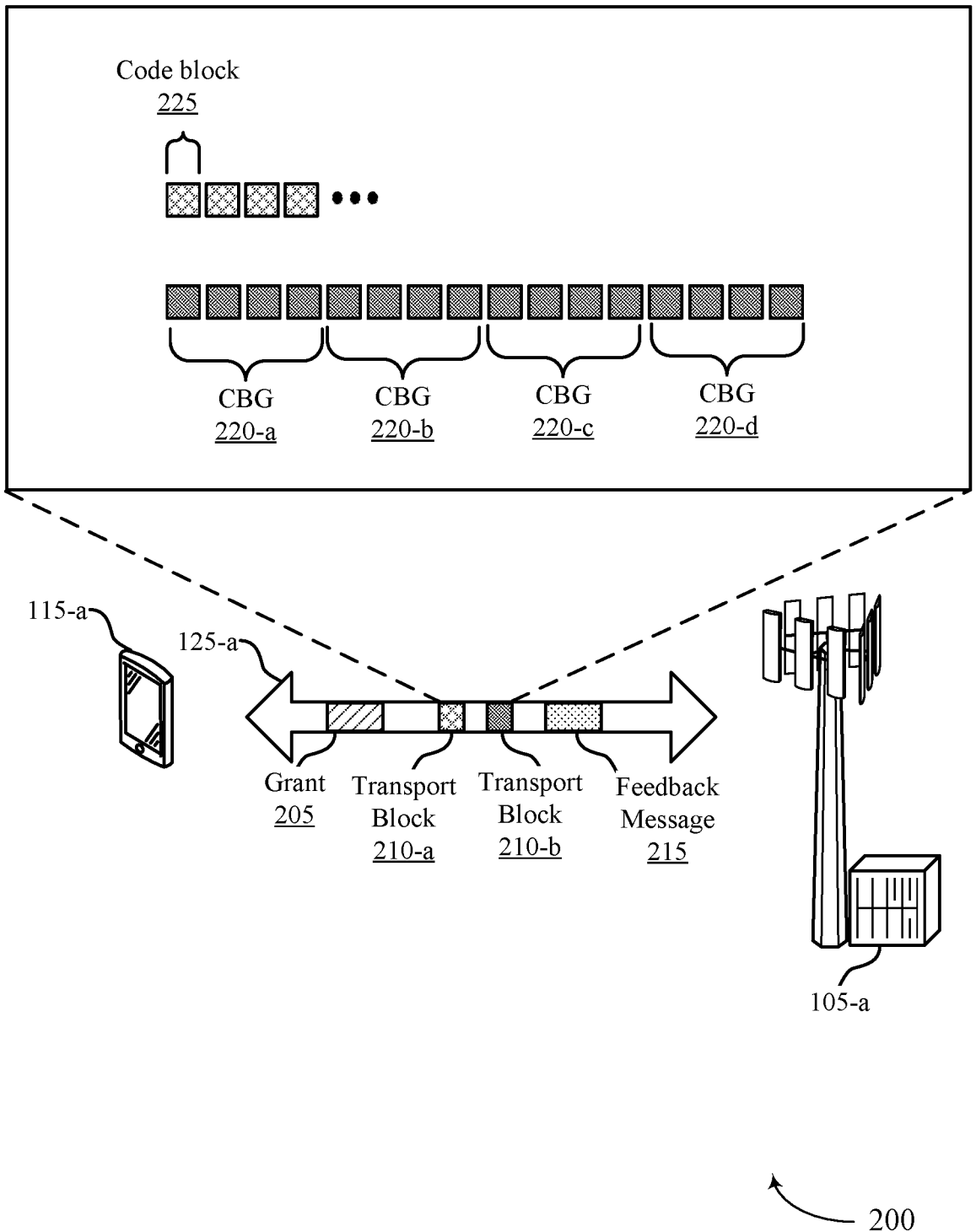
FIG. 2 illustrates an example of a wireless communications system that supports CBG-based transmissions for multi-codeword channels in accordance with one or more aspects of the present disclosure.

FIG. 2 illustrates an example of a wireless communications system 200 that supports CBG-based transmissions for multi-codeword channels in accordance with one or more aspects of the present disclosure. In some examples, the wireless communications system 200 may be implemented by one or more aspects of the wireless communications system 100. For instance, a UE 115-*a* may be an example of a UE 115, and a network entity 105-*a* may be an example of a network entity 105, as described with reference to FIG. 1.

The UE 115-*a* may communicate with the network entity 105-*a* via bidirectional communication link 125-*a*. In some examples, the UE 115-*a* may receive transport blocks 210 from the network entity 105. Each transport block 210 may include one or more code blocks (e.g., code blocks 225), which may be grouped into CBGs (e.g., CBGs 220). A UE 115-*a* may support CBG-based feedback signaling.

The UE 115-*a* may provide feedback signaling (e.g., a HARQ-ACK message indicating successful reception, or a HARQ NACK message indicating failed reception) in response to attempting to receive the transport blocks 210. In some cases, the UE 115-*a* may support CBG-based HARQ feedback signaling. When the UE 115-*a* is configured for CBG-based HARQ feedback, the UE 115-*a* may feedback 1 bit HARQ-ACK per CBG. For example, if the UE 115-*a* receives CBG 220-*a*, CBG 220-*b*, CBG 220-*c*, and CBG 220-*d* in the transport block 210-*b*, then the UE 115-*a* may indicate 4 bits of HARQ-ACK for the transport block 210-*b*. The UE 115-*a* may feedback 1 bit indicating ACK if the UE 115-*a* correctly decodes all of the one or more code blocks 225 in a given CBG 220. Otherwise, the UE 115-*a* may feedback 1 bit indicating NACK (e.g., if the UE 115-*a* incorrectly decodes at least one of the one or more code blocks 225 in a given CBG 220). For instance, if the UE 115-*a* receives six CBGs in the transport block 210-*a* (e.g., each of the six CBGs including one or more code blocks 225), and the UE 115-*a* incorrectly decodes a first code block 225 in the second CBG of the transport block 210-*a* and a second code block in a fifth CBG of the transport block 210-*a*, the UE 115-*a* may send CBG-based feedback indicating the following for the six CBGs: ACK, NACK, ACK, ACK, NACK, ACK.

In response to receiving the indicated CBG-based HARQ feedback, the network entity 105-*a* may retransmit the CBGs from the previous transmission that were received in error, or were incorrectly decoded, in accordance with the CBG-based feedback indicated by the UE 115-*a*. In some examples, the UE 115-*a* may receive a grant 205 (e.g., a DCI) including downlink grants that the UE 115-*a* may use to receive initial transmissions of transport blocks 210 including one or more CBGs 220, and to receive retransmissions of one or more of the CBGs 220 received in error. The UE 115 may report feedback information using a quantity of HARQ-ACK feedback bits for each of the transport blocks 210 that is equivalent to a threshold quantity of CBGs in each of the transport blocks 210. Accordingly, the grant 205 may include a CBG transmission information (CBGTI) field indicating which CBGs 220 are retransmitted by the network entity 105-*a* (e.g., in response to the CBG-based HARQ feedback). The CBGTI field of the grant 205 may have a bitwidth equivalent to the threshold quantity of CBGs for each of the transport blocks 210. For example, if the UE 115-*a* is configured with a higher layer parameter (e.g., RRC parameter maxCodeBlockGroupsPerTransportBlock=4), and is configured to support CBG-based HARQ feedback, then the UE 115-*a* may report feedback for 4 CBGs in a given transport block 210.

In some cases, a PDSCH occasion may include a single transport block 210 (e.g., one codeword) for up to four transmission layers (e.g., rank 4). For transmissions supporting more than four layers, subsets of layers may be mapped to different transport blocks 210 (e.g., different code words). For example, if the UE 115 is scheduled to receive a PDSCH with v>4, a radio resource control (RRC) parameter (e.g., maxNrofCodeWordsScheduledByDCI) may configure the UE 115 with a threshold quantity of transport blocks 210 (e.g., 2) to be scheduled by downlink control information (DCI). Based on the RRC parameter, the UE 115 may receive DCI scheduling up to the threshold quantity of transport blocks. For instance, if the RRC parameter indicates a value of 2 and v=5, the first $\lfloor v/2 \rfloor$ layers may be mapped to the first transport block, and the remaining $\lceil v/2 \rceil$ layers may be mapped to the second transport block. That is, the first transport block may be associated with two layers on the PDSCH, and the second transport block may be associated with 3 layers on the PDSCH.

Thus, the UE 115-*a* may be configured with a threshold quantity of transport blocks scheduled by DCI for the PDSCH (e.g., if the PDSCH is to carry more than 4 layers). For example, if the UE 115 is configured with an RRC parameter value of 2 (e.g., RRC parameter maxNrofCodeWordsScheduledByDCI=2), the UE 115-*a* may receive a first transport block (e.g., transport block 210-*a*) and a second transport block (e.g., transport block 210-*b*) during a PDSCH reception occasion. The transport blocks 210 may each include one or more code blocks. The quantity of code blocks for the transport blocks 210 may be based on the quantity of spatial layers of the respective transport blocks 210. For example, for PDSCH transmissions having 5 layers, the transport block 210-a may be associated with 2 layers and the transport block 210-b may be associated with 3 layers, in which case the transport block 210-b may have more code blocks than the transport block 210-a. In some cases, the transport block 210-a and the transport block 210-b may be different sizes. In some examples, the smaller transport block (e.g., transport block 210-a) may have a smaller modulation and coding scheme (MCS) than the larger transport block (e.g., the transport block 210-b).

In some cases, even if each of the transport blocks 210 include a different quantity of code blocks, the UE 115-a may be configured to generate HARQ feedback according to a same threshold quantity of CBGs. For example, if the RRC parameter maxCodeBlockGroupsPerTransportBlock=4, the UE 115-a may report feedback for the transport block 210-a according to four CBGs (e.g., each CBG including one code block 225), and may report feedback for the transport block 210-b according to four CBGs 220. In such examples (e.g., where the transport block 210-a includes four code blocks 225), the UE 115-a may generate four HARQ feedback bits for four CBGs 220 corresponding to the first transport block 210-a (e.g., each CBG 220 corresponding to a single code block 225).

As described herein, the threshold quantity of CBGs per transport block may be configured at the UE 115-a via higher layer signaling (e.g., maxCodeBlockGroupsPer-TransportBlock). The value of the threshold quantity of CBGs may be 2, 4, 6, or 8 for a single transport block 210, or may be 2 or 4 for two transport blocks 210 scheduled during a single PDSCH occasion (e.g., where a higher layer parameter such as maxNrofCodeWordsSCheduledByDCI is set to 2). As described herein, the two transport blocks (e.g., the transport block 210-a and the transport block 210-b) scheduled for the same PDSCH occasion may have a same threshold quantity of CBGs, even if they have different quantities of code blocks (e.g., due to different transport block sizes, different MCSs, different quantities of layers, etc.). In such examples, the UE 115-a may be configured to report CBG-based HARQ feedback for both transport blocks 210 using a same quantity of CBGs. The UE 115-a may generate four bits of HARQ feedback for the transport block 210-a (e.g., four bits for four respective CBGs 220, where each CBG 220 includes one of four code blocks 225) and four bits of HARQ feedback for the transport block 210-b (e.g., four bits for four respective CBGs 220, where each CBG 220 includes four code blocks 225). Such a scenario may result in different quantities of code blocks per CBG for each of the two transport blocks 210.

Further, some wireless communications techniques may not support CBG-based transmission and HARQ-ACK feedback for one transport block 210, and transport block-based transmission and HARQ-ACK feedback for another transport block 210 communicated via the same PDSCH. In some cases, transmitting feedback using a same granularity (e.g., a same quantity of CBGs 220 for each of the transport blocks 210) may result in unnecessary overhead, unnecessary retransmissions, inefficient use of computational resources and system resources, and increased system latency. For example, if the UE 115-a is configured to transmit CBG-based feedback in accordance with the received CBGs 220 included within the transport block 210-b, the UE 115-a may also transmit CBG-based feedback four a small quantity of code blocks 225 of the transport block 210-a. This may result in a high granularity of feedback for transport block 210-a (e.g., which may have a smaller size, a smaller quantity of layers, or a smaller MCS), which may result in increased signaling overhead for feedback transmissions. Additionally, or alternatively, the UE 115-a may not support different granularities of feedback signaling for different transport blocks 210, which may result in unnecessary signaling overhead, less efficient use of computational resources, increased system latency, and decreased user experience.

Techniques described herein may support increased flexibility in the granularity of HARQ feedback for transport blocks 210 having different parameter values (e.g., having different sizes, MCSs, quantities of layers, etc.). The network entity 105-a may transmit the grant 205 including resources scheduling the transport block 210-a and the transport block 210-b in a PDSCH occasion of a component carrier. Transport block 210-a may be smaller than transport block 210-b, or may have a lower MCS, or less layers. In a feedback message 215, the UE 115-a may provide transport block level feedback for the transport block 210-a and CBG level feedback for the transport block 210-b. Thus, the UE 115-a may not expend computational resources on generating HARQ feedback for individual code blocks 225 for transport block 210-a, and may save signaling overhead by generating transport block-based HARQ feedback for the transport block 210-a, while maintaining the benefits of increased granularity and decreased signaling overhead for retransmissions associated with CBG-based HARQ feedback for the largest transport block 210-b. Additionally, or alternatively, as described herein, the UE 115-a and the network entity 105-a may support CBG-based HARQ feedback and retransmissions for two transport blocks, where the HARQ feedback and retransmissions correspond to different quantities of CBGs for each respective transport block 210 (e.g., instead of the same quantity of CBGs per transport block).

Techniques described herein may be applied when transport blocks 210 have different parameters (e.g., different sizes, different MCSs, different quantities of layers, etc.). In some examples, techniques described herein may support rate splitting MIMO signaling. For example, for each UE 115 of multiple co-scheduled UEs 115 (e.g., including the UE 115-a), the network may provide (e.g., via the network entity 105-a) a common transport block (e.g., the transport block 210-a) and a private transport block (e.g., the transport block 210-b). The common transport block and/or the private transport block may be mapped to different sets of layers of a PDSCH. For instance, the network entity 105-a may transmit a common transport block 210-a (e.g., broadcast or multicast to a set of UEs 115 including the UE 115-a) and may transmit a private transport block 210-b directly to the UE 115-a. The set of UEs 115 may decode the common transport block 210-a (e.g., which may have a smaller MCS and rank), while the private transport block 210-b may be decoded by the UE 115-a to which it is addressed (e.g., and may therefore have a larger MCS and rank if the UE 115-a is cell-center). In such examples, the transport block 210-a and the transport block 210-b may have different sizes, MCSs, ranks, or a combination thereof, and technique described herein may support more flexible and efficient HARQ-feedback signaling.

The UE 115-a may be configured to provide transport block-based HARQ-ACK feedback for a first transport block 210-a, and CBG-based HARQ-ACK feedback for a second transport block 210-b. For instance, the UE 115-a may be scheduled (e.g., via the grant 205) with two transport blocks 210 (e.g., in a PDSCH occasion of a component carrier). The UE 115-a may receive an RRC message that configures the UE 115-a to provide transport block level feedback for the transport block 210-a and CBG level feedback for the transport block 210-b. The RRC message may configure the different levels of feedback per component carrier or set of frequency resources (e.g., per band, per bandwidth part, etc.). In such examples, the UE 115-a may provide one bit of feedback for the first transport block 210-a (e.g., one HARQ bit for the transport block 210-a) and may provide a quantity of feedback bits (e.g., N) for up to N CBGs 220 of the second transport block 210-b. In some examples, N may be defined by the threshold quantity of CBGs configured via RRC signaling (e.g., the RRC parameter maxCodeBlockGroupsPerTransportBlock). Additionally, the CBGTI field of the DCI scheduling the PDSCH transmission of the transport blocks 210 may indicate which CBGs 220 of transport block 210-b are present in the transmission. Accordingly, the network entity 105-a may indicate, to the UE 115-a, scheduling information for retransmissions of the CBGs 220-a, 220-b, 220-c, and/or 220-d, based on the CBGTI field of the DCI.

The UE 115-a may determine which of the two scheduled transport blocks 210 corresponds to transport block level feedback and which transport block 210 corresponds to CBG level feedback. The UE 115-a may make such a determination based on comparing one or more parameters of the respective transport blocks 210 (e.g., type of transport block, size of transport block, quantity of code blocks in each transport block, MCS of each transport block, rank, ordering, or any combination thereof. For example, the UE 115-a may determine that the transport block 210-a corresponds to the transport block level feedback and the transport block 210-b corresponds to the CBG level feedback if the transport block 210-a is a common transport block (e.g., if multiple UEs 115 attempt to decode the transport block 210-a) and the transport block 210-b is a private transport block (e.g., if only the UE 115-a may decode the transport block 210-b). Additionally or alternatively, the UE 115-a may determine the transport block 210-a corresponds to the transport block level feedback and the transport block 210-b corresponds to the CBG level feedback if the transport block 210-a is smaller than the transport block 210-b. Additionally or alternatively, the UE 115-a may determine that the transport block 210-a corresponds to the transport block level feedback and the transport block 210-b corresponds to the CBG level feedback if the transport block 210-a includes a smaller quantity of code blocks than the transport block 210-b. Additionally or alternatively, the UE 115-a may determine that the transport block 210-a corresponds to the transport block level feedback and the transport block 210-b corresponds to the CBG level feedback if the transport block 210-a has a smaller MCS than the transport block 210-b. Additionally or alternatively, the UE 115-a may determine that the transport block 210-a corresponds to the transport block level feedback and the transport block 210-b corresponds to the CBG level feedback the transport block 210-a has a smaller transmission rank than the transport block 210-b. Additionally or alternatively, the UE 115-a may determine that the transport block 210-a corresponds to the transport block level feedback and the transport block 210-b corresponds to the CBG level feedback if the transport block 210-a is associated with chronologically earlier DCI fields (e.g., MCS/NDI/RV fields of the DCI) than the transport block 210-b.

Techniques described herein may support various types of feedback signaling, including Type 2 HARQ-ACK codebook. In some examples, as described in greater detail with reference to FIG. 3, transport block level feedback for the first transport block 210-a may be included in a transport block based sub-codebook, while CBG level feedback for the second transport block 210-b may be included in a CBG-based sub-codebook. In some examples, as described in greater detail with reference to FIG. 4, feedback for both transport block 210-a and transport block 210-b may be included in a CBG-based sub-codebook, where each DAI position in the CBG-based sub-codebook for a component carrier corresponds to a quantity of bits equal to N+1, where N is the threshold quantity of CBGs configured for the component carrier.

In some examples, the UE 115-a may use a Type 1 HARQ-ACK codebook. For example, the UE 115-a may use a semi-static HARQ-ACK codebook based on possible PDSCH reception occasions to generate the feedback message 215. For instance, if the UE 115-a uses a Type 1 HARQ-ACK codebook and is configured with N CBGs per transport block 210, each PDSCH reception occasion may correspond to N·2 bits in the HARQ-ACK codebook. That is, for a PDSCH reception including the transport block 210-a and the transport block 210-b, the transport block level feedback for the transport block 210-a may be repeated N times in the HARQ-ACK codebook. Accordingly, the PDSCH scheduled by a DCI format that does not support CBG-based PDSCH repetitions, and if the component carrier is RRC configured with a CBG-based PDSCH, feedback for the transport block 210 may still be repeated N times. If the UE 115 does not receive DCI for the Type 1 HARQ-ACK codebook, the UE 115-a may not experience codebook size mismatch.

In some examples, if the UE 115-a supports transport block level feedback for the transport block 210-a and CBG level feedback for the transport block 210-b, and if the UE 115-a is configured with N CBGs for the transport block 210-b, the UE 115 may use a Type 1 HARQ-ACK codebook where each PDSCH reception occasion corresponds to N+1 bits in the HARQ-ACK codebook. For example, the UE 115-a may map the feedback for the transport block 210-a to the first bit or last bit for the PDSCH occasion, and the UE 115-a may map the feedback for the transport block 210-b to the remaining N bits for the PDSCH occasion. In some cases, if a DCI schedules one transport block with CBG level feedback for the PDSCH occasion (e.g., instead of two transport blocks), N bits of the N+1 bits may correspond to N CBGs of the single transport block. In such cases, the UE 115-a may set the last bit to be NACK, or the UE 115-a may set the last bit to the decoding result of the one transport block (e.g., 1 if all CBGs are decoded successfully, 0 otherwise). In some cases, if a DCI schedules one transport block 210 with transport block level feedback for a different PDSCH occasion, 1 bit may be repeated N+1 times in the HARQ-ACK codebook.

In some examples, the UE 115-a may use a Type 3 HARQ-ACK codebook (e.g., a codebook construction based on a set of HARQ process identifiers (IDs), to generate the feedback message 215. For instance, if the UE 115-a uses a Type 3 HARQ-ACK codebook and is configured with N CBGs per transport block, each HARQ process ID may correspond to N+1 bits in the HARQ-ACK codebook (e.g., N bits for the N CBGs of the second transport block 210-b and 1 bit for the first transport block). The feedback for the first transport block 210-a may be mapped to either the first bit or the last bit of the N+1 bits for the HARQ process ID.

In some cases, techniques described herein may support CBG-level HARQ-ACK feedback for multiple transport blocks 210 with different threshold quantities of CBGs, resulting in HARQ-ACK feedback for the different transport blocks 210 including a first quantity of bits or the first transport block 210-a and a second quantity of bits for the second transport block 210-b. In such cases, signaling of the transport blocks 210 enabled for CBG transmission, corresponding CBG level HARQ feedback, and CBG retransmissions respective to the corresponding CBG level HARQ feedback may be enhanced to improve resource efficiency by configuring the UE 115-a to transmit CBG level feedback for the transport blocks 210 in the feedback message 215 with configurable quantities of feedback bits. In such aspects, the UE 115-a may transmit a first quantity of feedback bits (e.g., N1 bits) for the transport block 210-a and a second quantity of feedback bits (e.g., N2 bits) for the transport block 210-b, where the second quantity of feedback bits is greater than the first quantity of feedback bits (e.g., N2>N1). The values of N1 and N2 may be RRC configured (e.g., per component carrier, per BWP, etc.). In some examples, a DCI may dynamically schedule on transport block or two transport blocks, and may indicate the values of N1 and N2.

The UE 115-a may provide N1 bits of feedback for up to N1 CBGs for the first transport block 210-a, and may provide N2 bits of feedback for up to N2 CBGs of the second transport block 210-b. In some examples, the CBGTI field of the DCI scheduling the PDSCH transmission (e.g., used for scheduling retransmissions) may include a quantity of bits equal to N1+N2.

The UE 115-a may determine which of the two scheduled transport blocks 210 corresponds to N1 and which transport block 210 corresponds N2. The UE 115-a may make such a determination based on comparing one or more parameters of the respective transport blocks 210 (e.g., type of transport block, size of transport block, quantity of code blocks in each transport block, MCS of each transport block, rank, ordering, or any combination thereof. For example, the UE 115-a may determine that the transport block 210-a corresponds to N1 and the transport block 210-b corresponds to N2 if the transport block 210-a is a common transport block (e.g., if multiple UEs 115 attempt to decode the transport block 210-a) and the transport block 210-b is a private transport block (e.g., if only the UE 115-a may decode the transport block 210-b). Additionally or alternatively, the UE 115-a may determine the transport block 210-a corresponds to N1 and the transport block 210-b corresponds to N2 if the transport block 210-a is smaller than the transport block 210-b. Additionally or alternatively, the UE 115-a may determine that the transport block 210-a corresponds to N1 and the transport block 210-b corresponds to N2 if the transport block 210-a includes a smaller quantity of code blocks than the transport block 210-b. Additionally or alternatively, the UE 115-a may determine that the transport block 210-a corresponds to N1 and the transport block 210-b corresponds to N2 if the transport block 210-a has a smaller MCS than the transport block 210-b. Additionally or alternatively, the UE 115-a may determine that the transport block 210-a corresponds to N1 and the transport block 210-b corresponds to N2 the transport block 210-a has a smaller transmission rank than the transport block 210-b. Additionally or alternatively, the UE 115-a may determine that the transport block 210-a corresponds to N1 and the transport block 210-b corresponds to N2 if the transport block 210-a is associated with chronologically earlier DCI fields (e.g., MCS/NDI/RV fields of the DCI) than the transport block 210-b.

In some examples, the network entity 105-a may only schedule one transport block 210 for a PDSCH occasion. In such examples, the UE 115-a may determine the threshold quantity of CBGs for the single transport block 210 based on N1 and N2. For example, the UE 115-a may determine that the threshold quantity of CBGs for the transport block 210 is equal to N1+N2 (e.g., which may be supported by the DCI, which includes N1+N2 bits and the HARQ-ACK codebook may include N1+N2 bits for each PDSCH occasion. In some examples, the UE 115-a may determine that the threshold quantity of CBGs for the transport block 210 is equal to whichever is greater between N1 and N2 (e.g., based on the assumption that the threshold quantity of CBGs per transport block 210 is not a function of whether a single transport block 210 is scheduled or not).

The UE 115-a, configured with N1 and N2, may support various types of HARQ-ACK codebooks. For example, the UE 115-a may support Type 2 HARQ-ACK codebooks. In such examples, the UE 115-a may provide feedback for both transport block 210-a and transport block 210-b in a CBG-based sub-codebook (e.g., as described with reference to FIG. 4). In such examples, each DAI position in a CBG-based sub-codebook for a given component carrier may correspond to N1+N2 bits for the CBGs of the first transport block 210-a and the second transport block 210-b.

The UE 115-a supports Type 1 HARQ-ACK codebooks. In such examples (e.g., where the UE 115-a is configured with N1 and N2), each PDSCH reception occasion may correspond to 2·max(N1,N2) bits in the HARQ-ACK codebook. When a PDSCH occasion includes two transport blocks 210, the last bits (e.g., the final N2-N1 bits) of the N2 bits corresponding to the first transport block 210-a (e.g., where the threshold quantity of CBGs that is highest is N1) may be set to NACK. In some examples (e.g., in a type 1 HARQ_ACK codebook), each PDSCH reception occasion may correspond to N1+N2 bits in the HARQ-ACK codebook.

The UE 115-a supports type 3 HARQ-ACK codebooks. In such examples (e.g., where the UE 115-a is configured with N1 and N2), for each HARQ process ID, the UE 115-a may place N1+N2 bits in the codebook.

The UE 115-a may be configured to transmit a maximum quantity of feedback bits for the transport block 210-a that is different from a maximum quantity of feedback bits for the transport block 210-b. For example, the UE 115-a may receive a maximum quantity of N1 CBGs on the transport block 210-a, and the UE 115-a may receive a maximum quantity of N2 CBGs on the transport block 210-a, where N2 is a value that is different or the same as N1. The RRC configuration may configure the values of N1 and N2 per component carrier or per BWP. In some examples, N2 may be greater than N1. For example, the UE 115-a may be RRC-configured to receive a maximum quantity 1 CBG (e.g., N1=1) on the transport block 210-a, and the UE 115-a may also be RRC-configured to receive a maximum quantity of 4 CBGs (e.g., N2=4) on the transport block 210-b. Accordingly, the UE 115-a may receive the code blocks 225 in 1 CBG in the transport block 210-a, and the UE 115-a may receive the CBG 220-a, the CBG 220-b, the CBG 220-c, and the CBG 220-d on the transport block 210-b.

Figure 3:
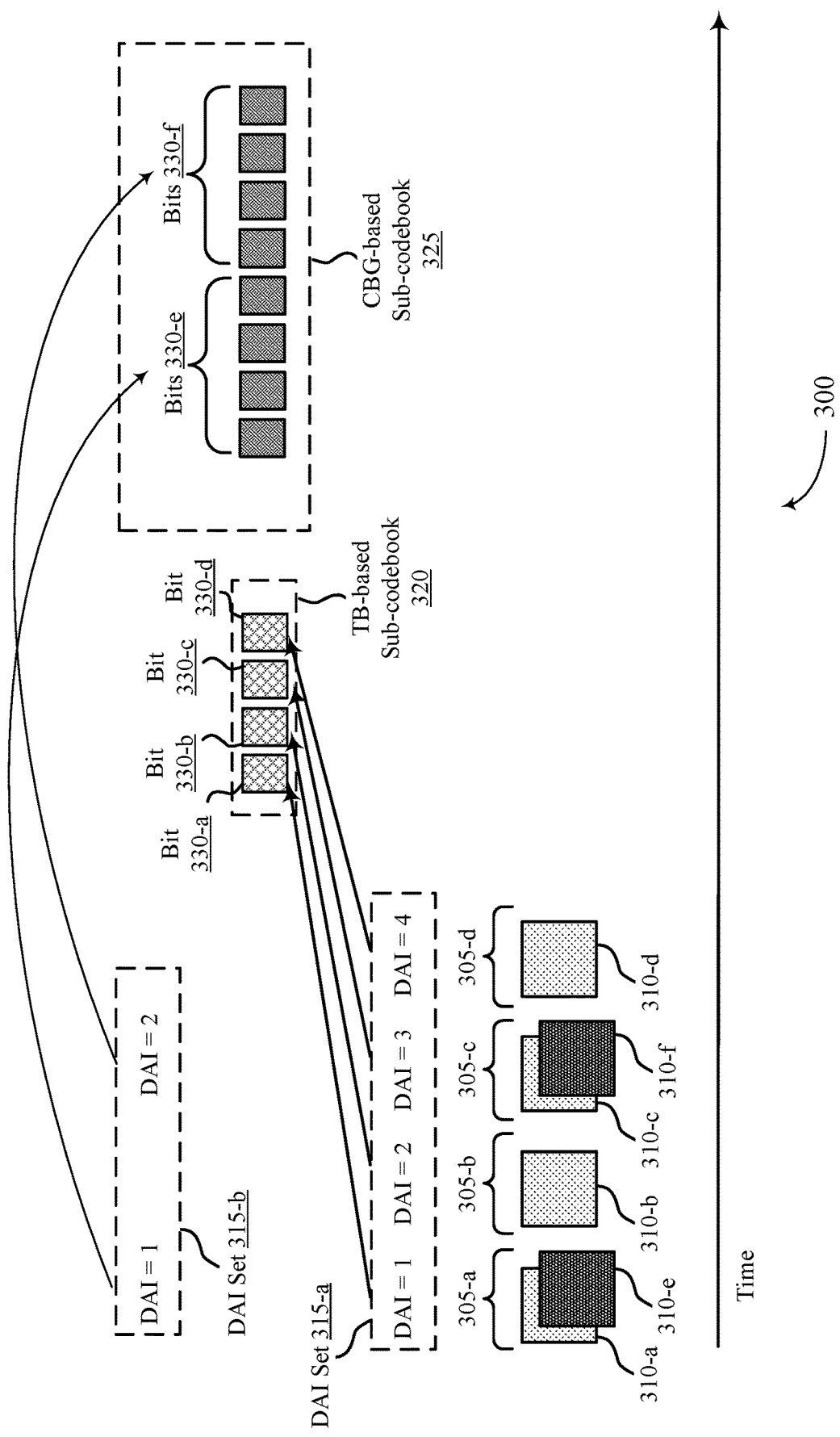
FIG. 3 illustrates an example of a mapping scheme that supports CBG-based transmissions for multi-codeword channels in accordance with one or more aspects of the present disclosure.

FIG. 3 illustrates an example of a mapping scheme 300 that supports CBG-based transmissions for multi-codeword channels in accordance with one or more aspects of the present disclosure. In some examples, the mapping scheme 300 may be implemented by one or more aspects of the wireless communications system 100. In some examples, the UE 115 may generate a feedback message by mapping feedback bits to transport blocks using DAI sets.

As described with reference to FIG. 2, the UE may be configured to support a both transport block level feedback and CBG level feedback. The UE may, for example, transmit HARQ feedback according to a type 2 codebook. For example, the network entity may transmit a grant (e.g., a DCI message) granting resources for one or more downlink transmissions on a PDSCH (e.g., in one or more PDSCH occasions 305) on a component carrier. The UE may be configured to report HARQ feedback for each of the PDSCH occasions 305. The UE may be scheduled to receive a single transport block 310 in some PDSCH occasions 305 (e.g., PDSCH occasion 305-b and PDSCH occasion 305-d), and may be further configured to receive multiple transport blocks 310 in some PDSCH occasions 305 (e.g., PDSCH occasion 305-a and PDSCH occasion 305-c). The UE may also be configured (e.g., via higher layer signaling) with a threshold quantity of CBGs (e.g., four). The UE may determine (e.g., as described in greater detail with reference to FIG. 2) that the UE is to provide transport block level feedback for transport block 310-a, transport block 310-b, transport block 310-c, and transport block 310-d, and that the UE is to provide CBG level feedback for transport block 310-e and transport block 310-f.

For a given multi-transport block PDSCH occasion 305, the UE may include transport block level feedback for a first transport block 310 using a transport block-based sub-codebook 320, and may include CBG level feedback for a second transport block 310 using a CBG-based sub-codebook 325. For example, for PDSCH occasion 305-a, the UE may generate bit 330-a of the transport block-based sub-codebook 320 indicating whether the UE successfully received transport block 310-a, and may generate bits 330-e (e.g., four bits 330-e for four CBGs) of the CBG-based sub-codebook 325 indicating whether the UE successfully received the four CBGs of the transport block 310-e.

In some examples, the DCI message granting resources on the component carrier of the PDSCH may include multiple DAI sets 315. Each DAI of the two DAI sets may correspond to DAI positions within the sub-codebooks. Thus, for the DAI set 315-b for CBG-based feedback, the CBG-based sub-codebook 325 may include two DAI positions (e.g., for the two PDSCH occasions 305 including transport blocks 310 for transport block level feedback). For the DAI set 315-a for transport block level feedback, the transport block-based sub-codebook 320 may include four DAI positions (e.g., one for each of the PDSCH occasions 305 that include a transport block 310 for transport block level feedback). The first DAI set 315-a may include four DAIS (e.g., DAI counters) corresponding to the four PDSCH occasions including a transport block 310 for transport block level feedback (e.g., transport block 310-a, transport block 310-b, transport block 310-c, and transport block 310-d). Each DAI of DAI set 315-a may map to a DAI position (e.g., a bit 330) in the transport block-based sub-codebook 320 (e.g., DAI=1 may map to bit 330-a, DAI=2 may map to bit 330-b, DAI=3 may map to bit 330-c, and DAI 4 may map to bit 330-d). Similarly, the DAIS of the second DAI set 315-b may correspond to DAI positions within the CBG-based sub-codebook. DAI=1 (e.g., for PDSCH occasion 305-a which includes transport block 310-e) may map to bits 330-e of CBG-based sub-codebook 325, and DAI=2 (e.g., for PDSCH occasion 305-c which includes transport block 310-f) may map to bits 330-f of CBG-based sub-codebook 325.

Figure 4:
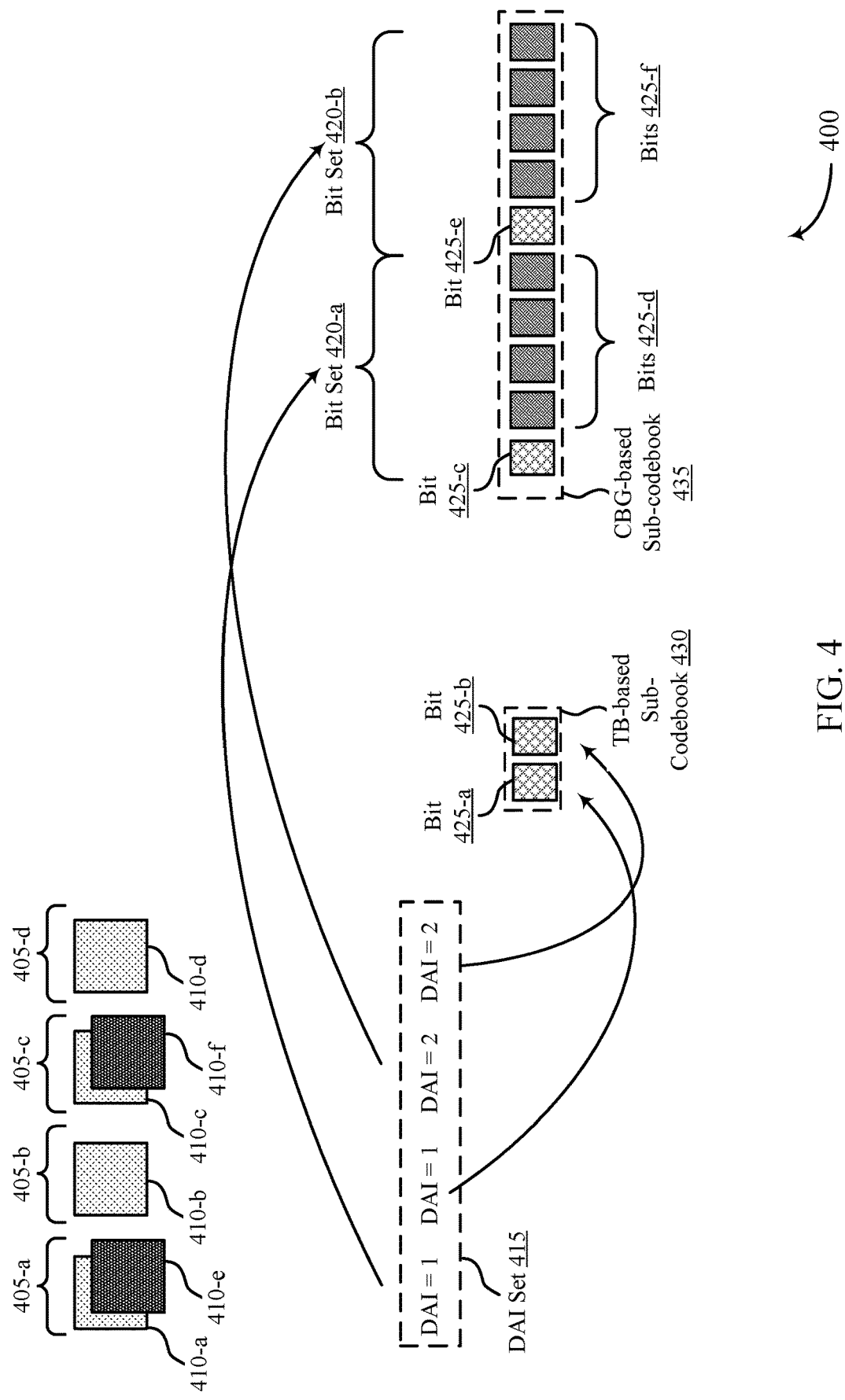
FIG. 4 illustrates an example of a mapping scheme that supports CBG-based transmissions for multi-codeword channels in accordance with one or more aspects of the present disclosure.

FIG. 4 illustrates an example of a mapping scheme 400 that supports CBG-based transmissions for multi-codeword channels in accordance with one or more aspects of the present disclosure. In some examples, the mapping scheme 400 may be implemented by one or more aspects of the wireless communications system 100. In some examples, the UE 115 may generate a feedback message by mapping feedback bits to transport blocks using a DAI set.

As described with reference to FIG. 2, the UE may be configured to support a both transport block level feedback and CBG level feedback. The UE may, for example, transmit HARQ feedback according to a type 2 codebook. For example, the network entity may transmit a grant (e.g., a DCI message) granting resources for one or more downlink transmissions on a PDSCH (e.g., in one or more PDSCH occasions 405) on a component carrier. The UE may be configured to report HARQ feedback for each of the PDSCH occasions 405. The UE may be scheduled to receive a single transport block 410 in some PDSCH occasions 405 (e.g., PDSCH occasion 405-b and PDSCH occasion 405-d), and may be further configured to receive multiple transport blocks 410 in some PDSCH occasions 405 (e.g., PDSCH occasion 405-a and PDSCH occasion 405-c). The UE may also be configured (e.g., via higher layer signaling) with a threshold quantity of CBGs (e.g., four). The UE may determine (e.g., as described in greater detail with reference to FIG. 2) that the UE is to provide transport block level feedback for transport block 410-a, transport block 410-b, transport block 410-c, and transport block 410-d, and that the UE is to provide CBG level feedback for transport block 410-e and transport block 410-f.

For a given multi-transport block PDSCH occasion 405 including two transport blocks 410, the UE may include transport block level feedback for a first transport block 410 and CBG level feedback for a second transport block 410 in a CBG-based sub-codebook 435. In such examples, each DAI position in the CBG-based sub-codebook 435 may correspond to N+1 bits (e.g., where N is the threshold quantity of CBGs configured for the component carrier, such as N=4). In such examples, for each DAI position in the CBG-based sub-codebook 435, N bits (e.g., the bits 425-d) may be allocated for CBG-based feedback for a transport block 410, and one additional bit (e.g., bit 425-c) may be allocated for transport block-based feedback for a transport block 410. The one additional bit may be the first bit or the last bit of the N+1 bits in each DAI position. For example, for PDSCH occasion 405-a, the UE may generate bit 425-c corresponding to transport block level feedback for the transport block 410-a, and may further generate bits 425-d (e.g., four bits, one for each of four CBGs) corresponding to CBG level feedback for transport block 410-e.

The UE may map feedback bits 425 to transport block 410 according to a single DAI set 415 (e.g., the DCI granting the resources of the PDSCH occasions 405 may indicate a single set of counter DAIS, instead of separate counter DAIS). That is, the UE may use a single DAI set 415 to map feedback bits 425 in both the TB-based sub-codebook 430 and the CG-based sub-codebook 435. For example, the UE may generate a single feedback bit 425-a corresponding to transport block 410-b in PDSCH occasion 405-b in a first DAI position of the transport block-based sub-codebook 430 (e.g., DAI=1 may map to bit 425-a for PDSCH occasion 405-b), and may generate a second feedback bit 425-b corresponding to transport block 410-d in PDSCH occasion 405-d in a second DAI position of the transport block-based sub-codebook 430

(e.g., DAI=2 may map to bit 425-*b* for PDSCH occasion 405-*d*). Similarly, the UE may generate bit set 420-*a* (e.g., including bit 425-*c* for transport block 410-*a* and bits 425-*d* for transport block 410-*e*) corresponding to PDSCH occasion 405-*a* in a first DAI position of the CBG-based sub-codebook 435 (e.g., DAI=1 also maps to bit set 420-*a* for PDSCH occasion 405-*a*), and may generate bit set 420-*b* (e.g., including bit 425-*e* for transport block 410-*c* and bits 425-*f* for transport block 410-*f*) corresponding to PDSCH occasion 405-*c* in a second DAI position of the CBG-based sub-codebook 435 (e.g., DAI=2 also maps to bit set 420-*b* for PDSCH occasion 405-*c*).

In some examples, the UE may be scheduled to perform downlink reception on multiple component carriers. A first component carrier may be configured for transport block level feedback and CBG level feedback, while other component carriers may not. In such examples, for CBG-based sub-codebooks 435, the threshold quantity of CBGs may correspond to a threshold quantity across the set of component carriers that are configured with CBG-based transmissions and feedback signaling. In such examples, the threshold quantity of CBGs for each component carrier may be determined based on one or more parameters. For example, if a component carrier is configured with a mode of communications (e.g., supporting CBG-based and transport block based feedback), then the threshold quantity of CBGs may be interpreted to be N+1. If the component carrier is configured with a threshold quantity of transport blocks 410 scheduled by a DCI is equal to two but is not configured with a communication mode supporting both transport block level and CBG level feedback (e.g., CBG-based feedback for both transport blocks 410), then the threshold quantity of CBGs may be interpreted as 2·N. If the component carrier is not configured with a threshold quantity of transport blocks 410 scheduled by DCI being two, then the threshold quantity of CBGs may be interpreted as N. N may be configured separately per component carrier, and the UE may interpret N according to the per component carrier configurations (e.g., for component carriers configured with CBG-based transmissions).

Figure 5:
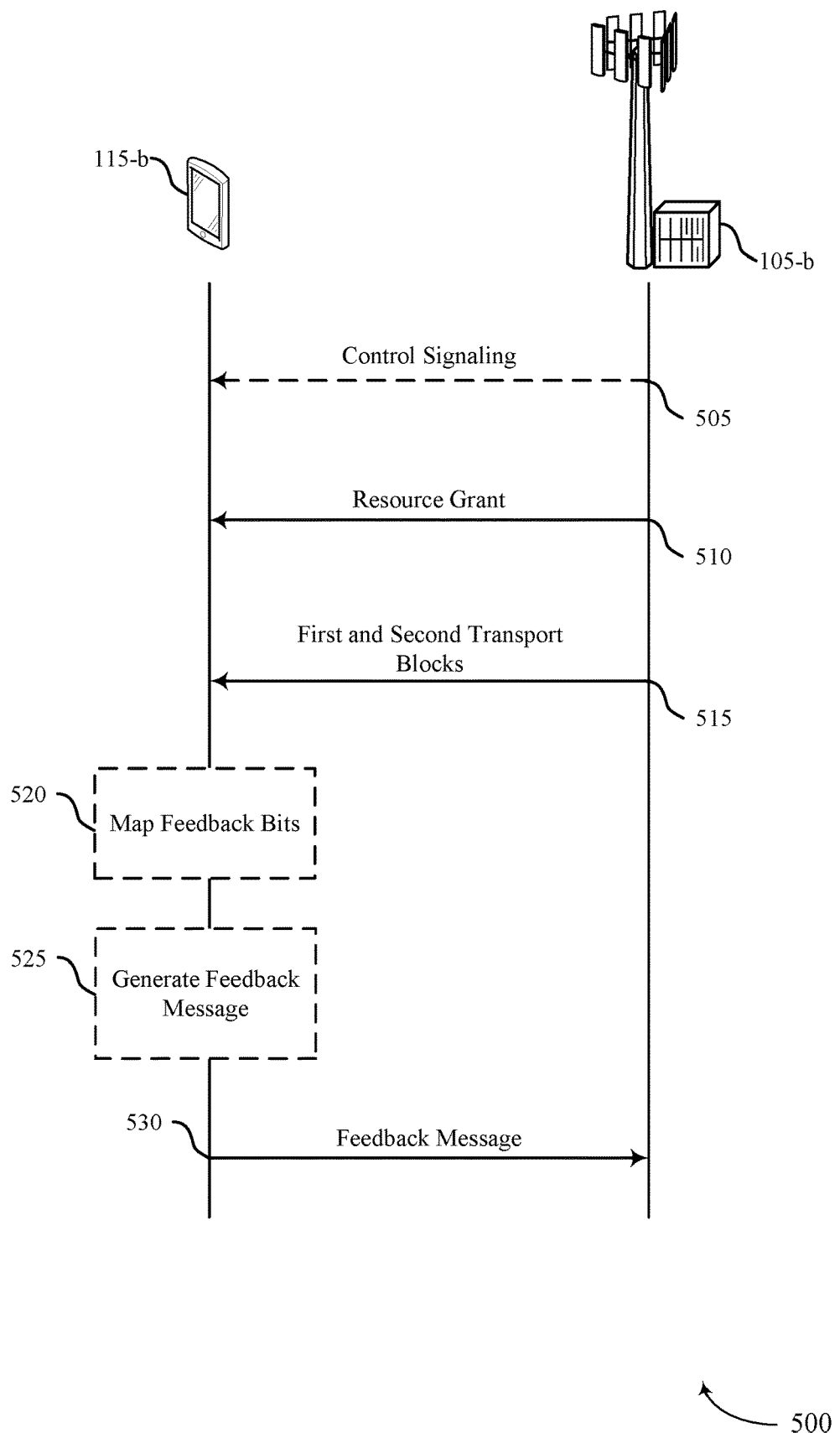
FIG. 5 illustrates an example of a process flow that supports CBG-based transmissions for multi-codeword channels in accordance with one or more aspects of the present disclosure.

FIG. 5 illustrates an example of a process flow 500 that supports CBG-based transmissions for multi-codeword channels in accordance with one or more aspects of the present disclosure. The process flow 500 may be implemented by aspects of the wireless communications systems 100 as described with reference to FIG. 1 and/or wireless communications system 200 as described with reference to FIG. 2. For example, a UE 115-*b* may be an example of a UE 115 as described with reference to FIG. 1 and a UE 115-*a* as described with reference to FIG. 2, and a network entity 105-*b* may be an example of a network entity 105 as described with reference to FIG. 1 and a network entity 105-*a* as described with reference to FIG. 2. Alternative examples of the following may be implemented, where some steps are performed in a different order than described or are not performed at all. In some cases, steps may include additional features not mentioned below, or further steps may be added.

At 505, the network entity 105-*b* may transmit, and the UE 115-*b* may receive, control signaling including an indication of transport block level feedback including a first quantity of feedback bits for a first transport block, and code block group level feedback including a second quantity of feedback bits for a second transport block. The first quantity of feedback bits may include one feedback bit, and the second quantity of feedback bits may include more than one feedback bit associated with a threshold quantity of CBGs.

Additionally or alternatively, the control signaling received by the UE 115-*b* may include an indication of a first quantity of feedback bits for the first transport block (e.g., N1) a second quantity of feedback bits for the second transport block (e.g., N2), where the second quantity of feedback bits is greater than the second quantity of feedback bits.

At 510, the network entity 105-*b* may transmit, and the UE 115-*b* may receive a grant of resources (e.g., a DCI message) scheduling the first transport block and the second transport block during a reception occasion on a component carrier. In some examples, the grant of resources may include a first set of DAIs associated with a first sub-codebook and a second set of DAIs associated with a second sub-codebook. In such examples, generating the first portion of the feedback message may be based on the first set of DAIs and generating the second portion of the feedback message may be based on the second set of DAIs.

In some examples, the grant of resource may include a set of DAIs for a first sub-codebook and a second codebook with transport block level feedback. In some aspects, each DAI position associated with a respective DAI of the set of DAIs may be associated with a quantity of feedback bits greater than or equal to a sum of the first quantity of feedback bits and the second quantity of feedback bits. In some aspects, each DAI position associated with a respective DAI of the set of DAIs may be associated with a quantity of feedback bits that is based on a threshold quantity of feedback bits supported across a plurality of component carriers that include the component carrier associated with the transport blocks.

In some examples, the grant of resource may include a set of DAIs for a sub-codebook with CBG level feedback, where each DAI associated with a respective DAI of the set of DAIs may be associated with a quantity of feedback bits equal to a sum of the first quantity of feedback bits and the second quantity of feedback bits.

At 515, the network entity 105-*b* may transmit, and the UE 115-*b* may receive, the first transport block and the second transport block during the reception occasion.

At 520, the UE 115-*b* may map feedback bits to the respective transport blocks. For example, the UE 115-*b* may map the first quantity of feedback bits to the first transport block and the second quantity of feedback bits to the second transport block based on a comparison between a first value of one or more parameters of the first transport block with a second value of the one or more parameters of the second transport block. The one or more parameters may include a transport block size, a quantity of codebooks, a MCS, a transmission rank, and identifier order in the grant of resources, or a combination thereof.

Additionally or alternatively, the UE 115-*b* may map the first quantity of feedback bits to the first transport block and the second quantity of feedback bits to the second transport block based on a comparison between a value of one or more parameters of the first transport block with a respective value of the one or more parameters of the second transport block. The one or more parameters may include a transport block size, a quantity of codebooks, a MCS, a transmission rank an identifier order in the grant of resources, or a combination thereof.

At 525, the UE 115-*b* may generate the feedback message. For example, the UE 115-*b* may generate a first portion of the feedback message such that the first portion includes the one feedback bit associated with the first transport block according to a first sub-codebook associated with transport block level feedback. Additionally or alternatively, the UE 115-*b* may generate a second portion of the feedback message such that the second portion includes the second quantity of feedback bits associated with the second transport block according to a second sub-codebook associated with CBG level feedback.

Additionally or alternatively, the UE 115-*b* may generate a first portion of the feedback message such that the first portion includes the one feedback associated with the first transport block and the second quantity of feedback bits associated with the second transport block according to a first sub-codebook with CBG level feedback.

In some examples, the UE 115-*b* may generate the feedback message according to a feedback codebook including a total quantity of feedback bits corresponding to a plurality of reception occasions on the component carrier. In some aspects, each of the plurality of reception occasions corresponding to a subset of the total quantity of feedback bits may be equal to a product of two and a threshold quantity of CBGs. In other aspects, each of the plurality of reception occasions corresponding to a subset of the total quantity of feedback bits may be equal to a sum of the first quantity of feedback bits and the second quantity of feedback bits.

In some examples, the UE 115-*b* may generate the feedback message according to a feedback codebook including a total quantity of feedback bits corresponding to a plurality of feedback process identifiers. Each of the plurality of feedback process identifiers may correspond to a subset of the total quantity of feedback bits equal to a sum of the first quantity of feedback bits and the second quantity of feedback bits.

In some examples, the UE 115-*b* may generate the first portion of the feedback message including the first quantity of feedback bits associated with the first transport block and the second quantity of feedback bits associated with the second transport block according to a sub-codebook with CBG level feedback.

At 530, the UE 115-*b* may transmit a feedback message associated with HARQ feedback and including the first quantity of feedback bits for the first transport block and the second quantity of feedback bits for the second transport block, where the first quantity of feedback bits is different from the second quantity of feedback bits.

Figure 6:
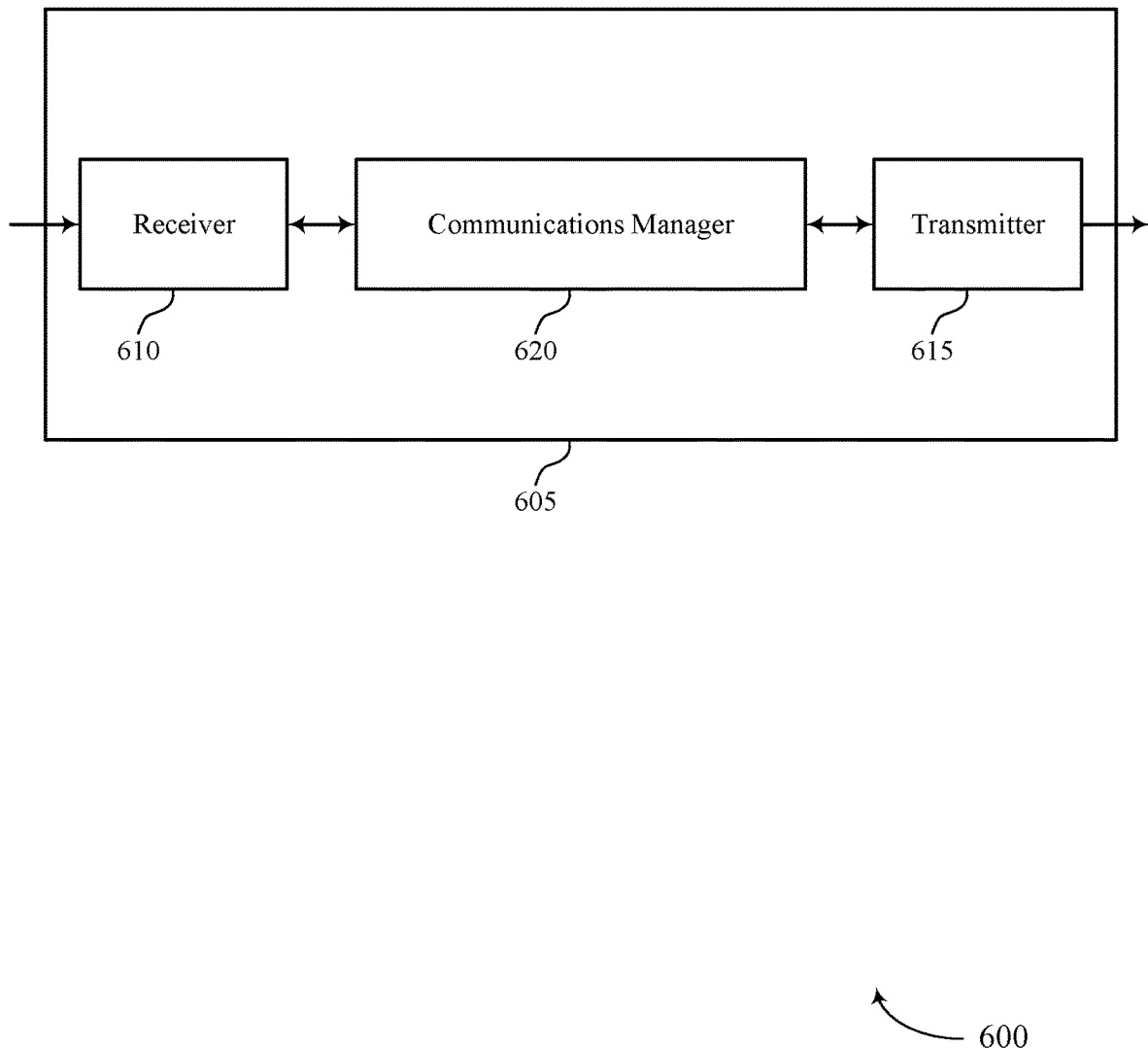
FIGS. 6 and 7 show block diagrams of devices that support CBG-based transmissions for multi-codeword channels in accordance with one or more aspects of the present disclosure.

FIG. 6 shows a block diagram 600 of a device 605 that supports CBG-based transmissions for multi-codeword channels in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to CBG-based transmissions for multi-codeword channels). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to CBG-based transmissions for multi-codeword channels). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of CBG-based transmissions for multi-codeword channels as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving a grant of resources scheduling a first transport block and a second transport block during a reception occasion on a component carrier. The communications manager 620 may be configured as or otherwise support a means for receiving the first transport block and the second transport block during the reception occasion. The communications manager 620 may be configured as or otherwise support a means for transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for enhanced feedback for a PDSCH including multiple transport blocks to support more efficient utilization of communication resources, higher data rates, and higher spectral efficiency. For example, the device 605 may support the transmission of feedback with variable granularity respective to each transport block on the PDSCH instead of transmitting feedback for the transport blocks by using the same granularity. By allowing for granularity respective to each transport block, the device 605 may prevent unnecessary overhead and unnecessary retransmissions, resulting in improved efficiency in resource utilization, decreased latency, and higher data rates.

Figure 7:
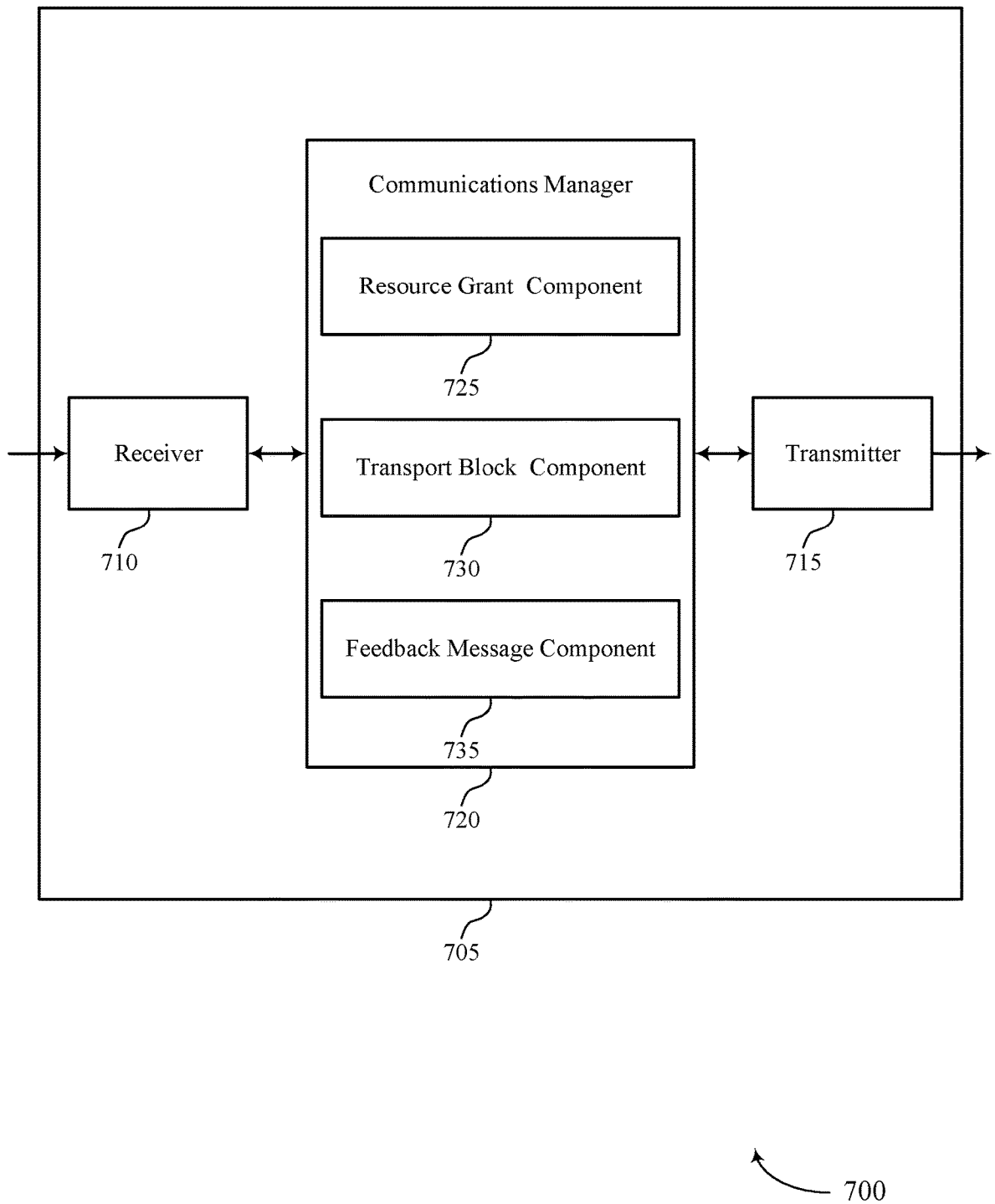

FIG. 7 shows a block diagram 700 of a device 705 that supports CBG-based transmissions for multi-codeword channels in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to CBG-based transmissions for multi-codeword channels). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to CBG-based transmissions for multi-codeword channels). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of CBG-based transmissions for multi-codeword channels as described herein. For example, the communications manager 720 may include a resource grant component 725, a transport block component 730, a feedback message component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The resource grant component 725 may be configured as or otherwise support a means for receiving a grant of resources scheduling a first transport block and a second transport block during a reception occasion on a component carrier. The transport block component 730 may be configured as or otherwise support a means for receiving the first transport block and the second transport block during the reception occasion. The feedback message component 735 may be configured as or otherwise support a means for transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits.

Figure 8:
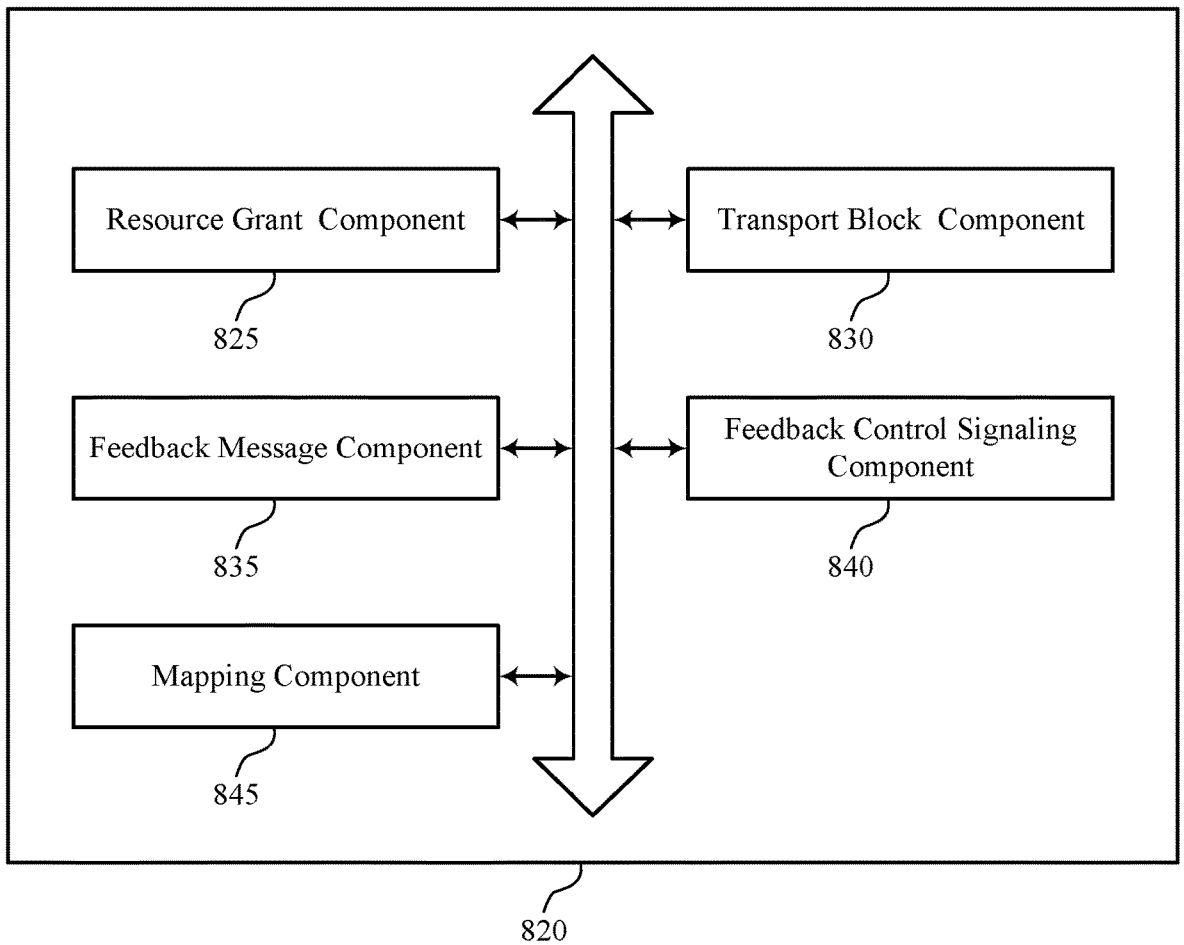
FIG. 8 shows a block diagram of a communications manager that supports CBG-based transmissions for multi-codeword channels in accordance with one or more aspects of the present disclosure.

FIG. 8 shows a block diagram 800 of a communications manager 820 that supports CBG-based transmissions for multi-codeword channels in accordance with one or more aspects of the present disclosure. The communications manager 820 may be an example of aspects of a communications manager 620, a communications manager 720, or both, as described herein. The communications manager 820, or various components thereof, may be an example of means for performing various aspects of CBG-based transmissions for multi-codeword channels as described herein. For example, the communications manager 820 may include a resource grant component 825, a transport block component 830, a feedback message component 835, a feedback control signaling component 840, a mapping component 845, or any combination thereof. Each of these components may communicate, directly or indirectly, with one another (e.g., via one or more buses).

The communications manager 820 may support wireless communications at a UE in accordance with examples as disclosed herein. The resource grant component 825 may be configured as or otherwise support a means for receiving a grant of resources scheduling a first transport block and a second transport block during a reception occasion on a component carrier. The transport block component 830 may be configured as or otherwise support a means for receiving the first transport block and the second transport block during the reception occasion. The feedback message component 835 may be configured as or otherwise support a means for transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits.

In some examples, the feedback control signaling component 840 may be configured as or otherwise support a means for receiving control signaling including an indication of transport block level feedback including the first quantity of feedback bits for the first transport block, and CBG level feedback including the second quantity of feedback bits for the second transport block, the first quantity of feedback bits including one feedback bit, and the second quantity of feedback bits including more than one feedback bit associated with a threshold quantity of CBGs.

In some examples, the mapping component 845 may be configured as or otherwise support a means for mapping the first quantity of feedback bits to the first transport block and the second quantity of feedback bits to the second transport block based on a comparison between a first value of one or more parameters of the first transport block with a second value of the one or more parameters of the second transport block, the one or more parameters including a transport block size, a quantity of codebooks, a modulation and coding scheme, a transmission rank, an identifier order in the grant of resources, or a combination thereof.

In some examples, the feedback message component 835 may be configured as or otherwise support a means for generating a first portion of the feedback message including the one feedback bit associated with the first transport block according to a first sub-codebook associated with transport block level feedback. In some examples, the feedback message component 835 may be configured as or otherwise support a means for generating a second portion of the feedback message including the second quantity of feedback bits associated with the second transport block according to a second sub-codebook associated with CBG level feedback.

In some examples, the resource grant component 825 may be configured as or otherwise support a means for receiving, in the grant of resources, a first set of downlink assignment indices associated with the first sub-codebook and a second set of downlink assignment indices associated with the second sub-codebook, where generating the first portion of the feedback message is based on the first set of downlink assignment indices and generating the second portion of the feedback message is based on the second set of downlink assignment indices.

In some examples, the feedback message component 835 may be configured as or otherwise support a means for generating a first portion of the feedback message including the one feedback bit associated with the first transport block and the second quantity of feedback bits associated with the second transport block according to a first sub-codebook with CBG level feedback.

In some examples, the resource grant component 825 may be configured as or otherwise support a means for receiving, in the grant of resources, a set of downlink assignment indices for the first sub-codebook and a second sub-codebook with transport block level feedback, where each downlink assignment index position associated with a respective downlink assignment index of the set of downlink assignment indices is associated with a quantity of feedback bits greater than or equal to a sum of the first quantity of feedback bits and the second quantity of feedback bits.

In some examples, each downlink assignment index position associated with a respective downlink assignment index of the set of downlink assignment indices is associated with the quantity of feedback bits that is based on a threshold quantity of feedback bits supported across a set of multiple component carriers including the component carrier.

In some examples, the feedback message component 835 may be configured as or otherwise support a means for generating the feedback message according to a feedback codebook including a total quantity of feedback bits corresponding to a set of multiple reception occasions on the component carrier.

In some examples, where each of the set of multiple reception occasions corresponds to a subset of the total quantity of feedback bits equal to a product of two and a threshold quantity of CBGs.

In some examples, where each of the set of multiple reception occasions corresponds to a subset of the total quantity of feedback bits equal to a sum of the first quantity of feedback bits and the second quantity of feedback bits.

In some examples, the feedback message component 835 may be configured as or otherwise support a means for generating the feedback message according to a feedback codebook including a total quantity of feedback bits corresponding to a set of multiple feedback process identifiers, where each of the set of multiple feedback process identifiers corresponds to a subset of the total quantity of feedback bits equal to a sum of the first quantity of feedback bits and the second quantity of feedback bits.

In some examples, the feedback control signaling component 840 may be configured as or otherwise support a means for receiving control signaling including an indication of the first quantity of feedback bits for the first transport block and the second quantity of feedback bits for the second transport block, where the second quantity of feedback bits is greater than the second quantity of feedback bits.

In some examples, the mapping component 845 may be configured as or otherwise support a means for mapping the first quantity of feedback bits to the first transport block and the second quantity of feedback bits to the second transport block based on a comparison between a value of one or more parameters of the first transport block with a respective value of the one or more parameters of the second transport block, the one or more parameters including a transport block size, a quantity of codebooks, a modulation and coding scheme, a transmission rank, an identifier order in the grant of resources, or a combination thereof.

In some examples, the feedback message component 835 may be configured as or otherwise support a means for generating a first portion of the feedback message including the first quantity of feedback bits associated with the first transport block and the second quantity of feedback bits associated with the second transport block according to a sub-codebook with CBG level feedback.

In some examples, the resource grant component 825 may be configured as or otherwise support a means for receiving, in the grant of resources, a set of downlink assignment indices for the sub-codebook, where each downlink assignment index position associated with a respective downlink assignment index of the set of downlink assignment indices is associated with a quantity of feedback bits equal to a sum of the first quantity of feedback bits and the second quantity of feedback bits.

Figure 9:
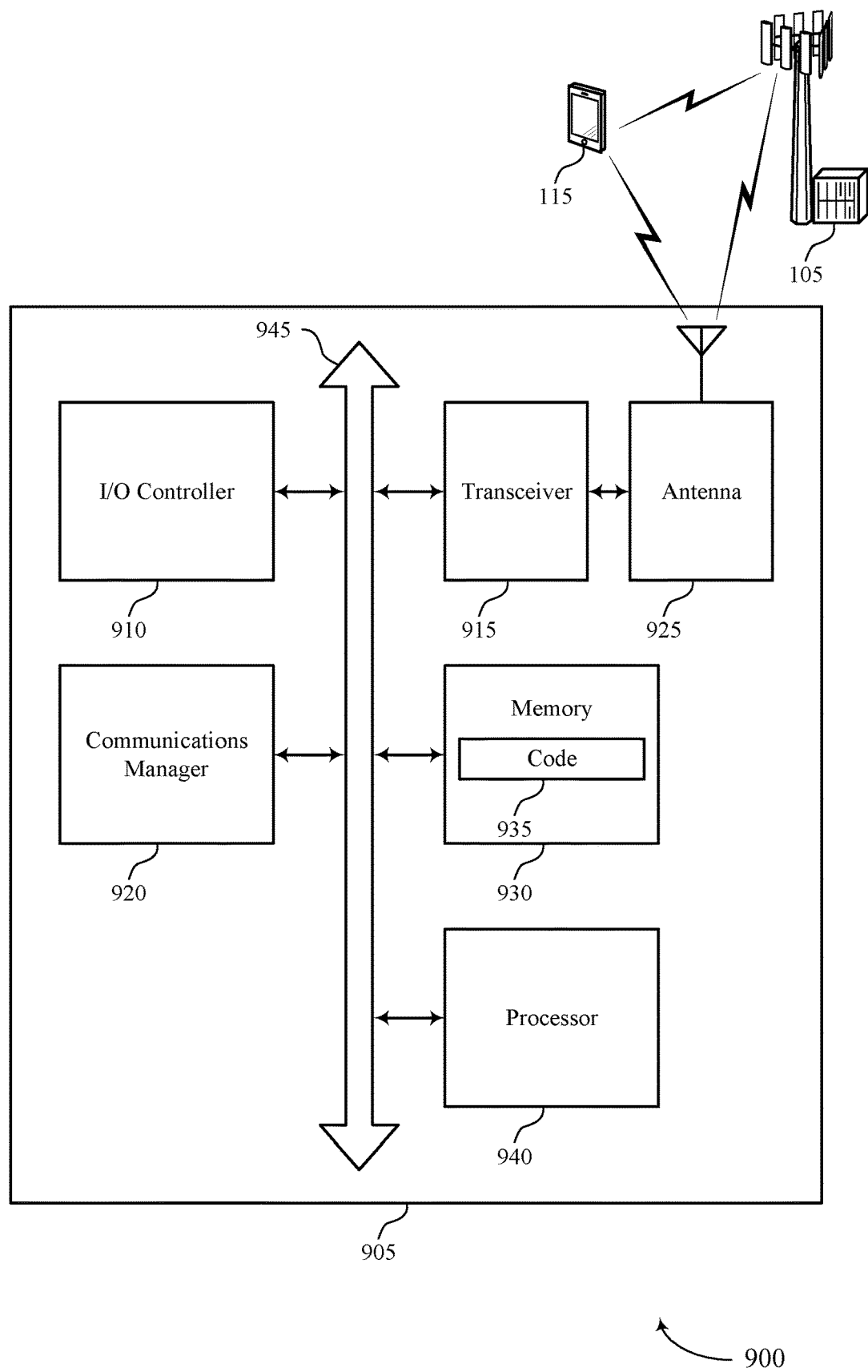
FIG. 9 shows a diagram of a system including a device that supports CBG-based transmissions for multi-codeword channels in accordance with one or more aspects of the present disclosure.

FIG. 9 shows a diagram of a system 900 including a device 905 that supports CBG-based transmissions for multi-codeword channels in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting CBG-based transmissions for multi-codeword channels). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a grant of resources scheduling a first transport block and a second transport block during a reception occasion on a component carrier. The communications manager 920 may be configured as or otherwise support a means for receiving the first transport block and the second transport block during the reception occasion. The communications manager 920 may be configured as or otherwise support a means for transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits.

By including or configuring the communications manager 920 in accordance with examples as described herein, the device 905 may support techniques for enhanced feedback for a PDSCH including multiple transport blocks to support reduced latency, improved user experience related to reduced processing, more efficient utilization of communication resources, longer battery life, and improved utilization of processing capability. For example, the device 905 may support the transmission of feedback with variable granularity respective to each transport block on the PDSCH instead of transmitting feedback for the transport blocks by using the same granularity. By allowing for granularity respective to each transport block, the device 905 may prevent unnecessary overhead and unnecessary retransmissions, resulting in improved efficiency in resource utilization. Accordingly, the device 905 may provide for reduced latency in communications, improved user experience related to reduced processing, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of CBG-based transmissions for multi-codeword channels as described herein, or the processor 940 and the memory 930 may be otherwise configured to perform or support such operations.

Figure 10:
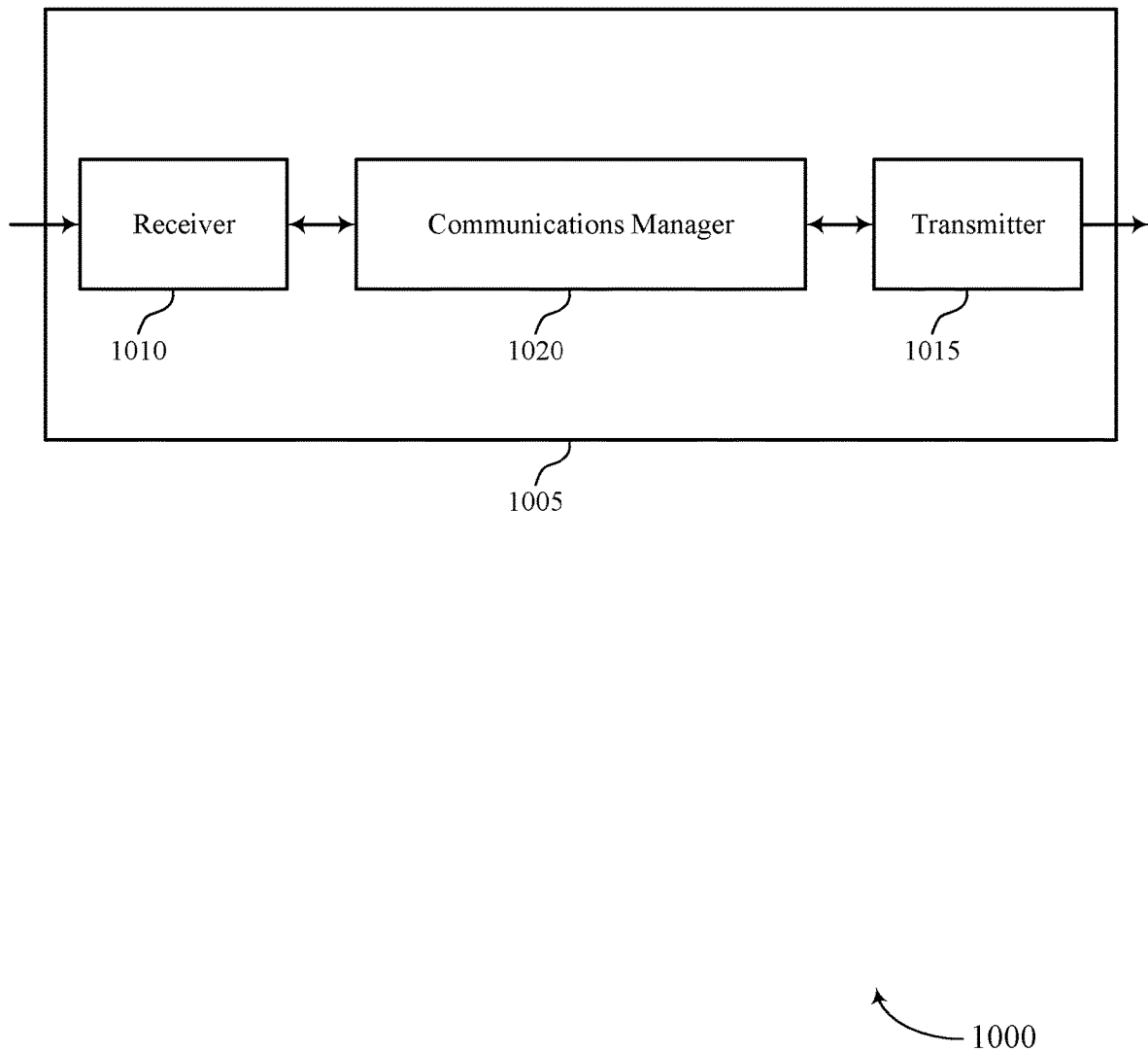
FIGS. 10 and 11 show block diagrams of devices that support CBG-based transmissions for multi-codeword channels in accordance with one or more aspects of the present disclosure.

FIG. 10 shows a block diagram 1000 of a device 1005 that supports CBG-based transmissions for multi-codeword channels in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of CBG-based transmissions for multi-codeword channels as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for outputting, a grant of resources scheduling a first transport block and a second transport block during a reception occasion on a component carrier. The communications manager 1020 may be configured as or otherwise support a means for obtaining the first transport block and the second transport block during the reception occasion based on receiving the grant of resources. The communications manager 1020 may be configured as or otherwise support a means for obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for enhanced feedback for a PDSCH including multiple transport blocks to support more efficient utilization of communication resources, higher data rates, and higher spectral efficiency. For example, the device 1005 may support the transmission of feedback with variable granularity respective to each transport block on the PDSCH instead of transmitting feedback for the transport blocks by using the same granularity. By allowing for granularity respective to each transport block, the device 1005 may prevent unnecessary overhead and unnecessary retransmissions, resulting in improved efficiency in resource utilization, decreased latency, and higher data rates.

Figure 11:
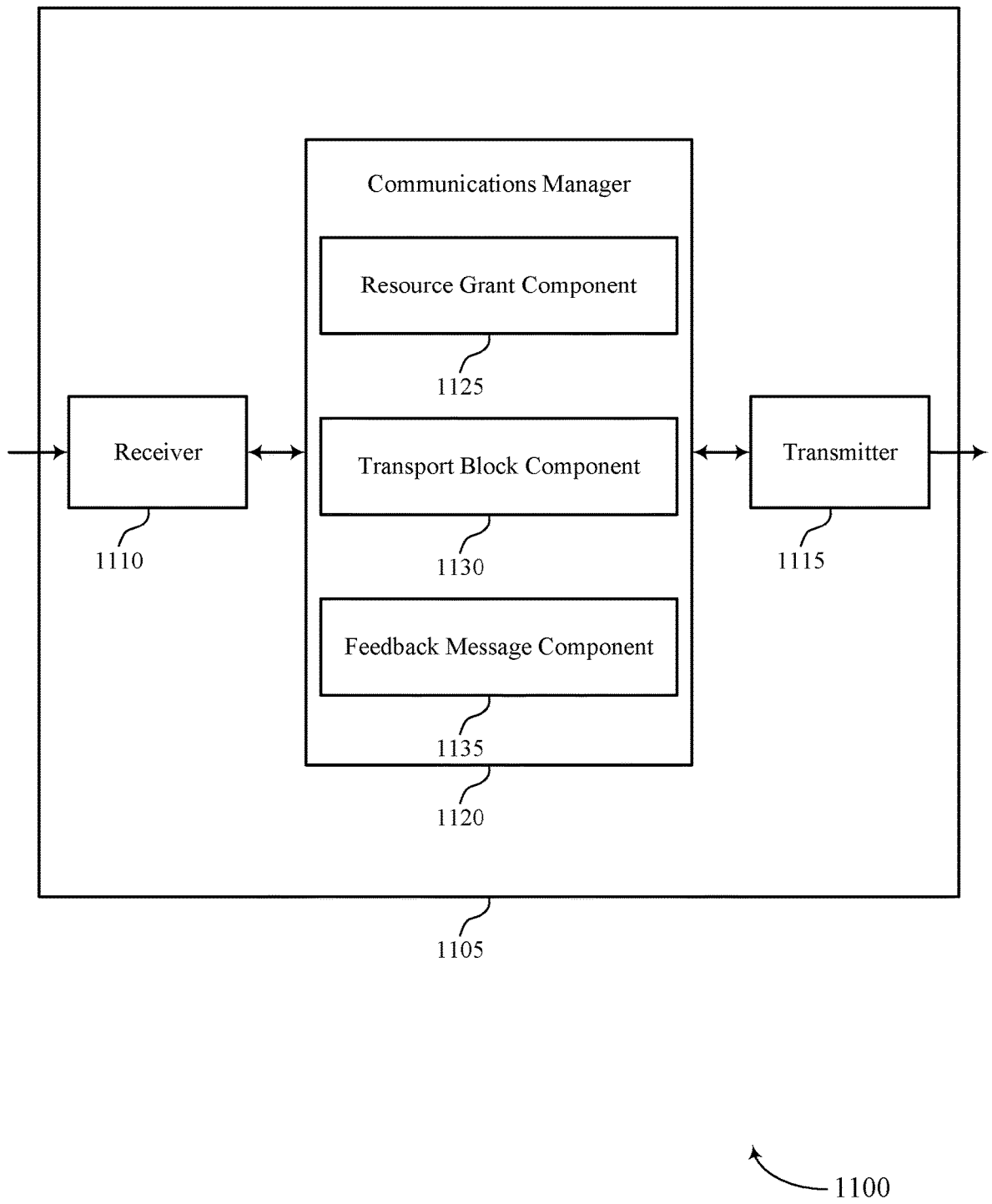

FIG. 11 shows a block diagram 1100 of a device 1105 that supports CBG-based transmissions for multi-codeword channels in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of CBG-based transmissions for multi-codeword channels as described herein. For example, the communications manager 1120 may include a resource grant component 1125, a transport block component 1130, a feedback message component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The resource grant component 1125 may be configured as or otherwise support a means for outputting, a grant of resources scheduling a first transport block and a second transport block during a reception occasion on a component carrier. The transport block component 1130 may be configured as or otherwise support a means for obtaining the first transport block and the second transport block during the reception occasion based on receiving the grant of resources. The feedback message component 1135 may be configured as or otherwise support a means for obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits.

Figure 12:
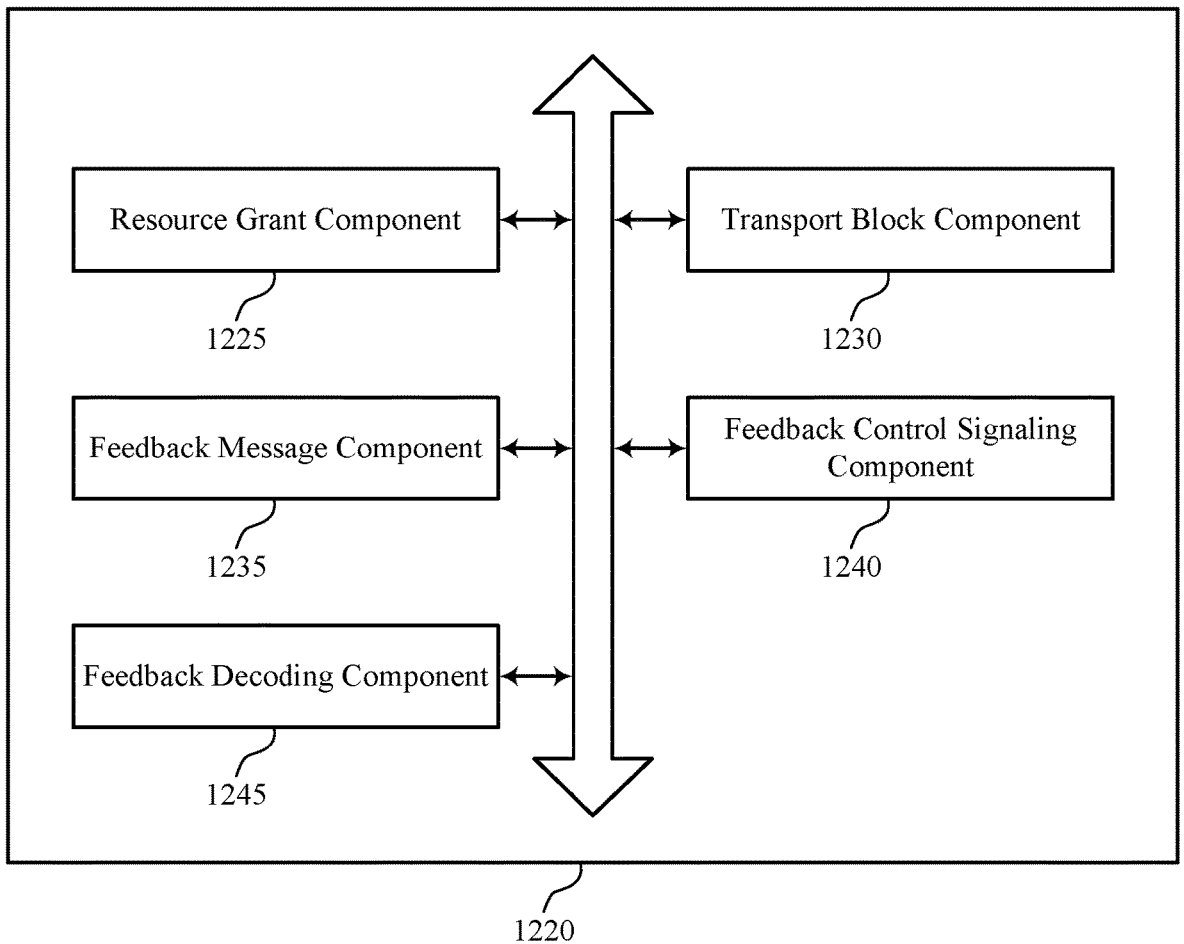
FIG. 12 shows a block diagram of a communications manager that supports CBG-based transmissions for multi-codeword channels in accordance with one or more aspects of the present disclosure.

FIG. 12 shows a block diagram 1200 of a communications manager 1220 that supports CBG-based transmissions for multi-codeword channels in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of CBG-based transmissions for multi-codeword channels as described herein. For example, the communications manager 1220 may include a resource grant component 1225, a transport block component 1230, a feedback message component 1235, a feedback control signaling component 1240, a feedback decoding component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The resource grant component 1225 may be configured as or otherwise support a means for outputting, a grant of resources scheduling a first transport block and a second transport block during a reception occasion on a component carrier. The transport block component 1230 may be configured as or otherwise support a means for obtaining the first transport block and the second transport block during the reception occasion based on receiving the grant of resources. The feedback message component 1235 may be configured as or otherwise support a means for obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits.

In some examples, the feedback control signaling component 1240 may be configured as or otherwise support a means for outputting control signaling including an indication of transport block level feedback including the first quantity of feedback bits for the first transport block, and CBG level feedback including the second quantity of feedback bits for the second transport block, the first quantity of feedback bits including one feedback bit, and the second quantity of feedback bits including more than one feedback bit associated with a threshold quantity of CBGs.

In some examples, the feedback decoding component 1245 may be configured as or otherwise support a means for decoding a first portion of the feedback message including the one feedback bit associated with the first transport block according to a first sub-codebook associated with transport block level feedback. In some examples, the feedback decoding component 1245 may be configured as or otherwise support a means for decoding a second portion of the feedback message including the second quantity of feedback bits associated with the second transport block according to a second sub-codebook associated with CBG level feedback.

In some examples, the resource grant component 1225 may be configured as or otherwise support a means for outputting, in the grant of resources, a first set of downlink assignment indices associated with the first sub-codebook and a second set of downlink assignment indices associated with the second sub-codebook, where decoding the first portion of the feedback message is based on the first set of downlink assignment indices and decoding the second portion of the feedback message is based on the second set of downlink assignment indices.

In some examples, the feedback decoding component 1245 may be configured as or otherwise support a means for decoding a first portion of the feedback message including the one feedback bit associated with the first transport block and the second quantity of feedback bits associated with the second transport block according to a first sub-codebook with CBG level feedback.

In some examples, the resource grant component 1225 may be configured as or otherwise support a means for outputting, in the grant of resources, a set of downlink assignment indices for the first sub-codebook and a second sub-codebook with transport block level feedback, where each downlink assignment index position associated with a respective downlink assignment index of the set of downlink assignment indices is associated with a quantity of feedback bits greater than or equal to a sum of the first quantity of feedback bits and the second quantity of feedback bits.

In some examples, each downlink assignment index position associated with a respective downlink assignment index of the set of downlink assignment indices is associated with the quantity of feedback bits that is based on a threshold quantity of feedback bits supported across a set of multiple component carriers including the component carrier.

In some examples, the feedback control signaling component 1240 may be configured as or otherwise support a means for outputting control signaling including an indication of the first quantity of feedback bits for the first transport block and the second quantity of feedback bits for the second transport block, where the second quantity of feedback bits is greater than the second quantity of feedback bits.

In some examples, the feedback decoding component 1245 may be configured as or otherwise support a means for decoding a first portion of the feedback message including the first quantity of feedback bits associated with the first transport block and the second quantity of feedback bits associated with the second transport block according to a sub-codebook with CBG level feedback.

In some examples, the resource grant component 1225 may be configured as or otherwise support a means for outputting, in the grant of resources, a set of downlink assignment indices for the sub-codebook, where each downlink assignment index position associated with a respective downlink assignment index of the set of downlink assignment indices is associated with a quantity of feedback bits equal to a sum of the first quantity of feedback bits and the second quantity of feedback bits.

Figure 13:
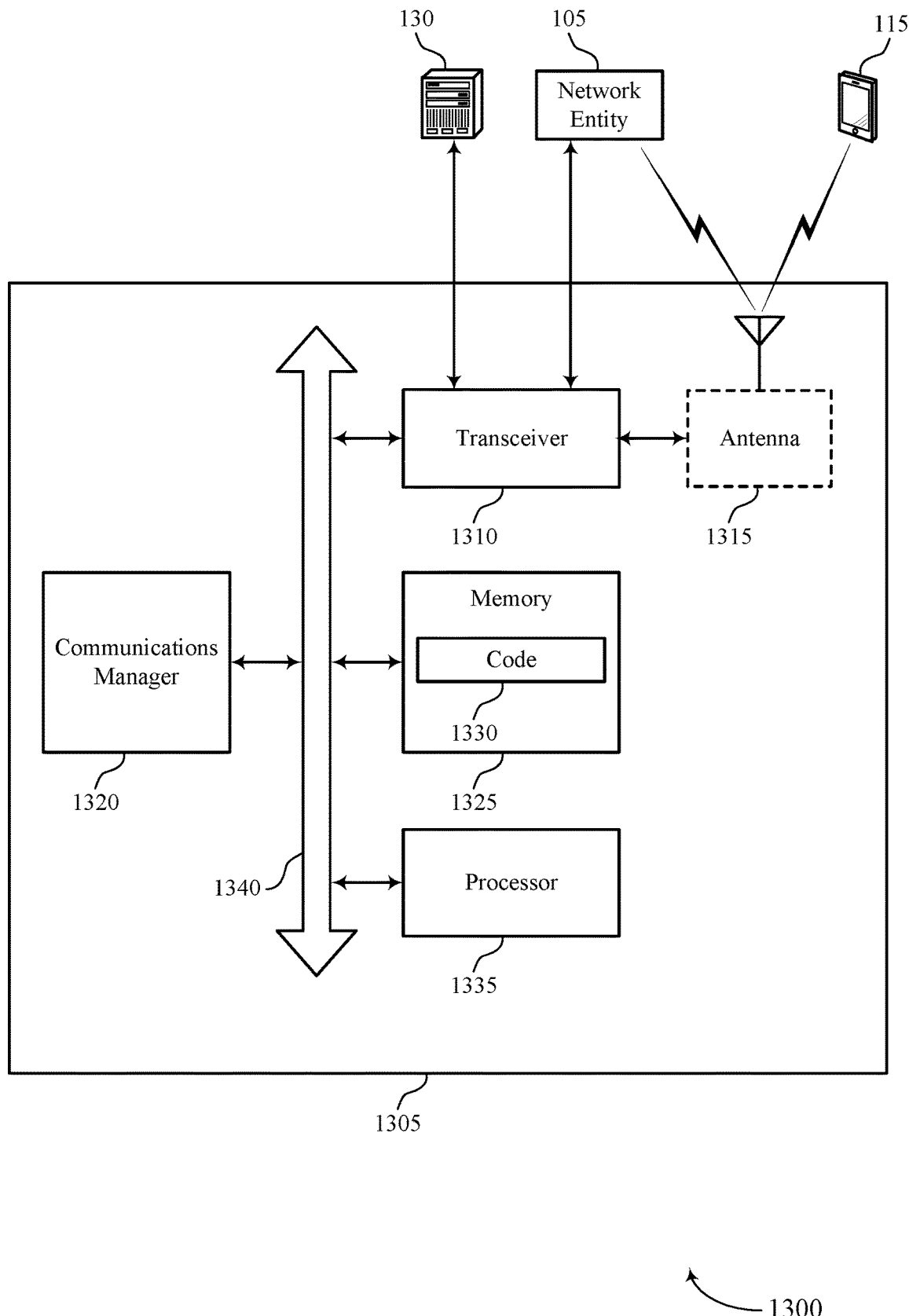
FIG. 13 shows a diagram of a system including a device that supports CBG-based transmissions for multi-codeword channels in accordance with one or more aspects of the present disclosure.

FIG. 13 shows a diagram of a system 1300 including a device 1305 that supports CBG-based transmissions for multi-codeword channels in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting CBG-based transmissions for multi-codeword channels). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for outputting, a grant of resources scheduling a first transport block and a second transport block during a reception occasion on a component carrier. The communications manager 1320 may be configured as or otherwise support a means for obtaining the first transport block and the second transport block during the reception occasion based on receiving the grant of resources. The communications manager 1320 may be configured as or otherwise support a means for obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits.

By including or configuring the communications manager 1320 in accordance with examples as described herein, the device 1305 may support techniques for enhanced feedback for a PDSCH including multiple transport blocks to support reduced latency, improved user experience related to reduced processing, more efficient utilization of communication resources, longer battery life, and improved utilization of processing capability. For example, the device 1305 may support the transmission of feedback with variable granularity respective to each transport block on the PDSCH instead of transmitting feedback for the transport blocks by using the same granularity. By allowing for granularity respective to each transport block, the device 1305 may prevent unnecessary overhead and unnecessary retransmissions, resulting in improved efficiency in resource utilization. Accordingly, the device 1305 may provide for reduced latency in communications, improved user experience related to reduced processing, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of CBG-based transmissions for multi-codeword channels as described herein, or the processor 1335 and the memory 1325 may be otherwise configured to perform or support such operations.

Figure 14:
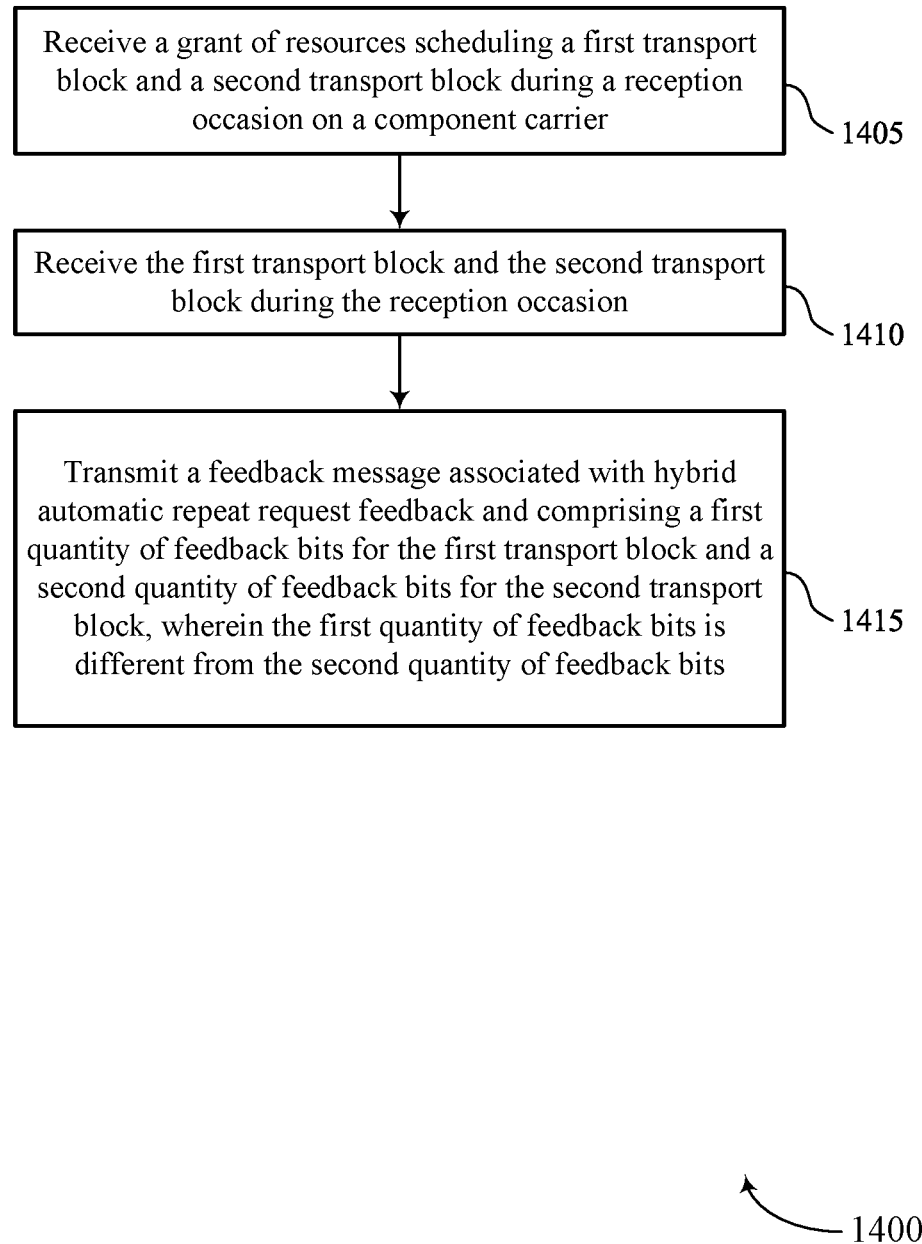
FIGS. 14 through 19 show flowcharts illustrating methods that support CBG-based transmissions for multi-codeword channels in accordance with one or more aspects of the present disclosure.

FIG. 14 shows a flowchart illustrating a method 1400 that supports CBG-based transmissions for multi-codeword channels in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a grant of resources scheduling a first transport block and a second transport block during a reception occasion on a component carrier. The operations of 1405 may be performed in accordance with examples as disclosed herein. In some examples, aspects of the operations of 1405 may be performed by a resource grant component 825 as described with reference to FIG. 8.

At 1410, the method may include receiving the first transport block and the second transport block during the reception occasion. The operations of 1410 may be performed in accordance with examples as disclosed herein. In some examples, aspects of the operations of 1410 may be performed by a transport block component 830 as described with reference to FIG. 8.

At 1415, the method may include transmitting a feedback message associated with hybrid automatic repeat request feedback and including a first quantity of feedback bits for the first transport block and a second quantity of feedback bits for the second transport block, where the first quantity of feedback bits is different from the second quantity of feedback bits. The operations of 1415 may be performed in accordance with examples as disclosed herein. In some examples, aspects of the operations of 1415 may be performed by a feedback message component 835 as described with reference to FIG. 8.

Figure 15:
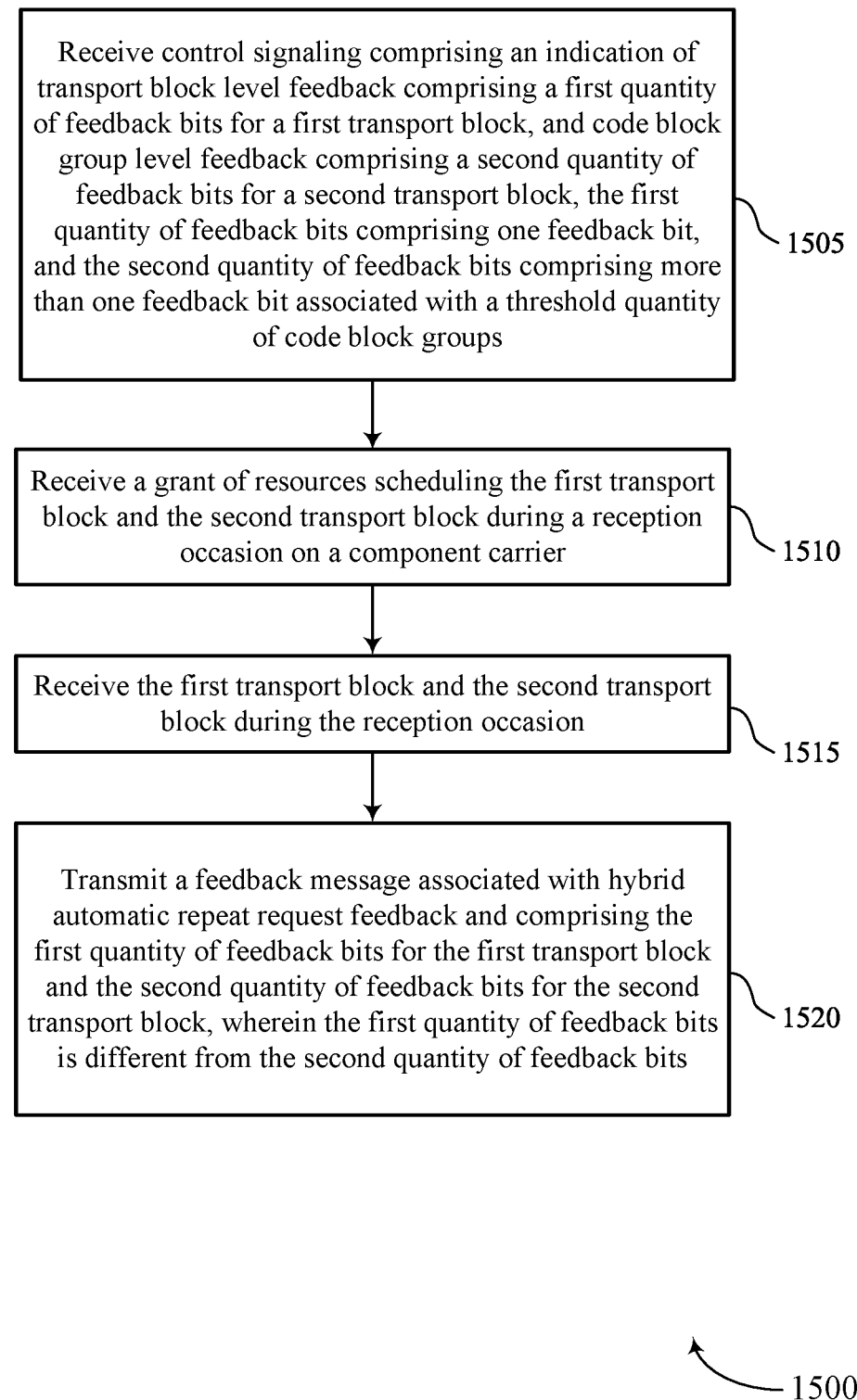

FIG. 15 shows a flowchart illustrating a method 1500 that supports CBG-based transmissions for multi-codeword channels in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving control signaling including an indication of transport block level feedback including a first quantity of feedback bits for a first transport block, and CBG level feedback including a second quantity of feedback bits for a second transport block, the first quantity of feedback bits including one feedback bit, and the second quantity of feedback bits including more than one feedback bit associated with a threshold quantity of CBGs. The operations of 1505 may be performed in accordance with examples as disclosed herein. In some examples, aspects of the operations of 1505 may be performed by a feedback control signaling component 840 as described with reference to FIG. 8.

At 1510, the method may include receiving a grant of resources scheduling the first transport block and the second transport block during a reception occasion on a component carrier. The operations of 1510 may be performed in accordance with examples as disclosed herein. In some examples, aspects of the operations of 1510 may be performed by a resource grant component 825 as described with reference to FIG. 8.

At 1515, the method may include receiving the first transport block and the second transport block during the reception occasion. The operations of 1515 may be performed in accordance with examples as disclosed herein. In some examples, aspects of the operations of 1515 may be performed by a transport block component 830 as described with reference to FIG. 8.

At 1520, the method may include transmitting a feedback message associated with hybrid automatic repeat request feedback and including the first quantity of feedback bits for the first transport block and the second quantity of feedback bits for the second transport block, where the first quantity of feedback bits is different from the second quantity of feedback bits. The operations of 1520 may be performed in accordance with examples as disclosed herein. In some examples, aspects of the operations of 1520 may be performed by a feedback message component 835 as described with reference to FIG. 8.

Figure 16:
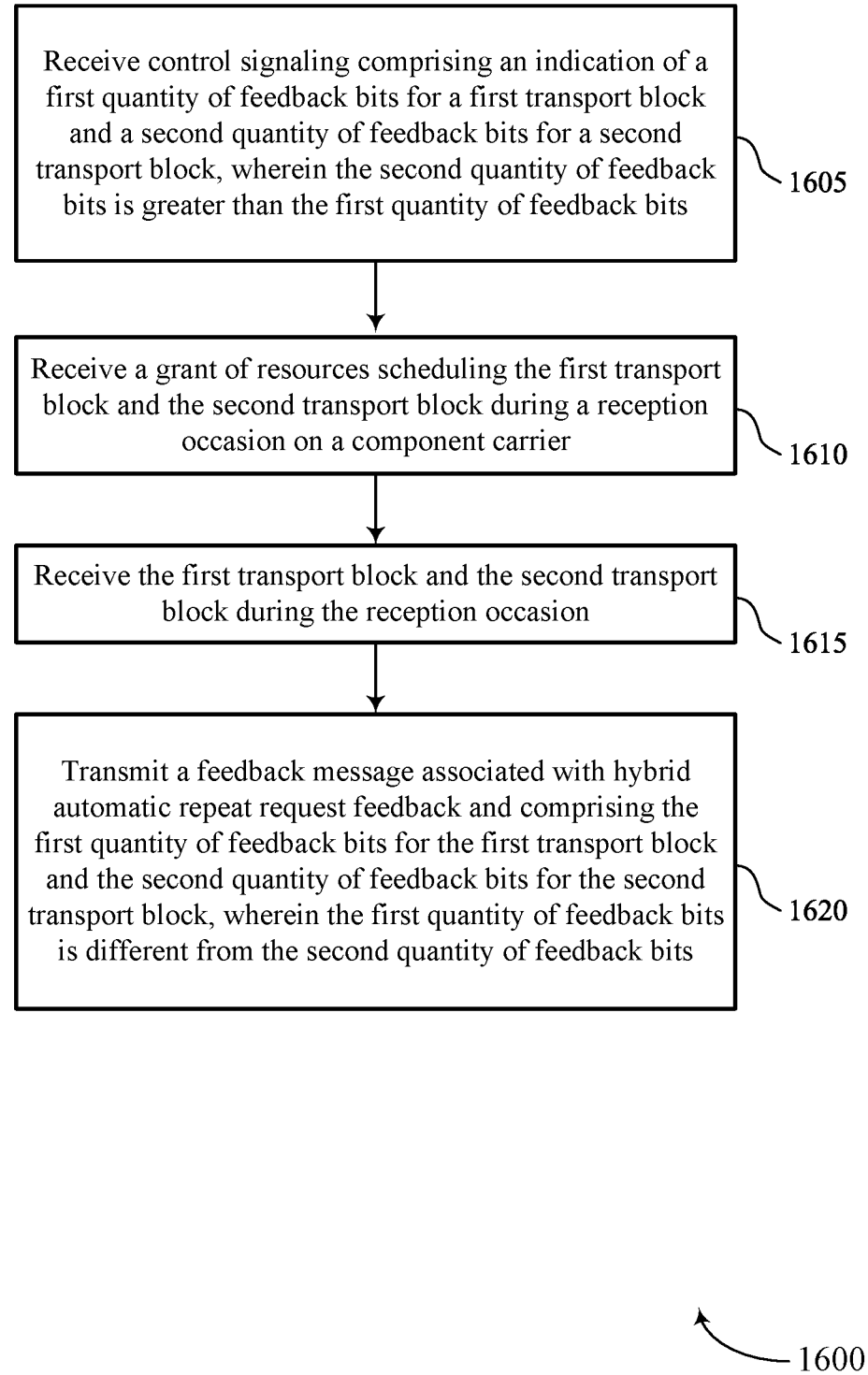

FIG. 16 shows a flowchart illustrating a method 1600 that supports CBG-based transmissions for multi-codeword channels in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving control signaling including an indication of a first quantity of feedback bits for a first transport block and a second quantity of feedback bits for the second transport block, where the second quantity of feedback bits is greater than the second quantity of feedback bits. The operations of 1605 may be performed in accordance with examples as disclosed herein. In some examples, aspects of the operations of 1605 may be performed by a feedback control signaling component 840 as described with reference to FIG. 8.

At 1610, the method may include receiving a grant of resources scheduling the first transport block and the second transport block during a reception occasion on a component carrier. The operations of 1610 may be performed in accordance with examples as disclosed herein. In some examples, aspects of the operations of 1610 may be performed by a resource grant component 825 as described with reference to FIG. 8.

At 1615, the method may include receiving the first transport block and the second transport block during the reception occasion. The operations of 1615 may be performed in accordance with examples as disclosed herein. In some examples, aspects of the operations of 1615 may be performed by a transport block component 830 as described with reference to FIG. 8.

At 1620, the method may include transmitting a feedback message associated with hybrid automatic repeat request feedback and including the first quantity of feedback bits for the first transport block and the second quantity of feedback bits for the second transport block, where the first quantity of feedback bits is different from the second quantity of feedback bits. The operations of 1620 may be performed in accordance with examples as disclosed herein. In some examples, aspects of the operations of 1620 may be performed by a feedback message component 835 as described with reference to FIG. 8.

Figure 17:
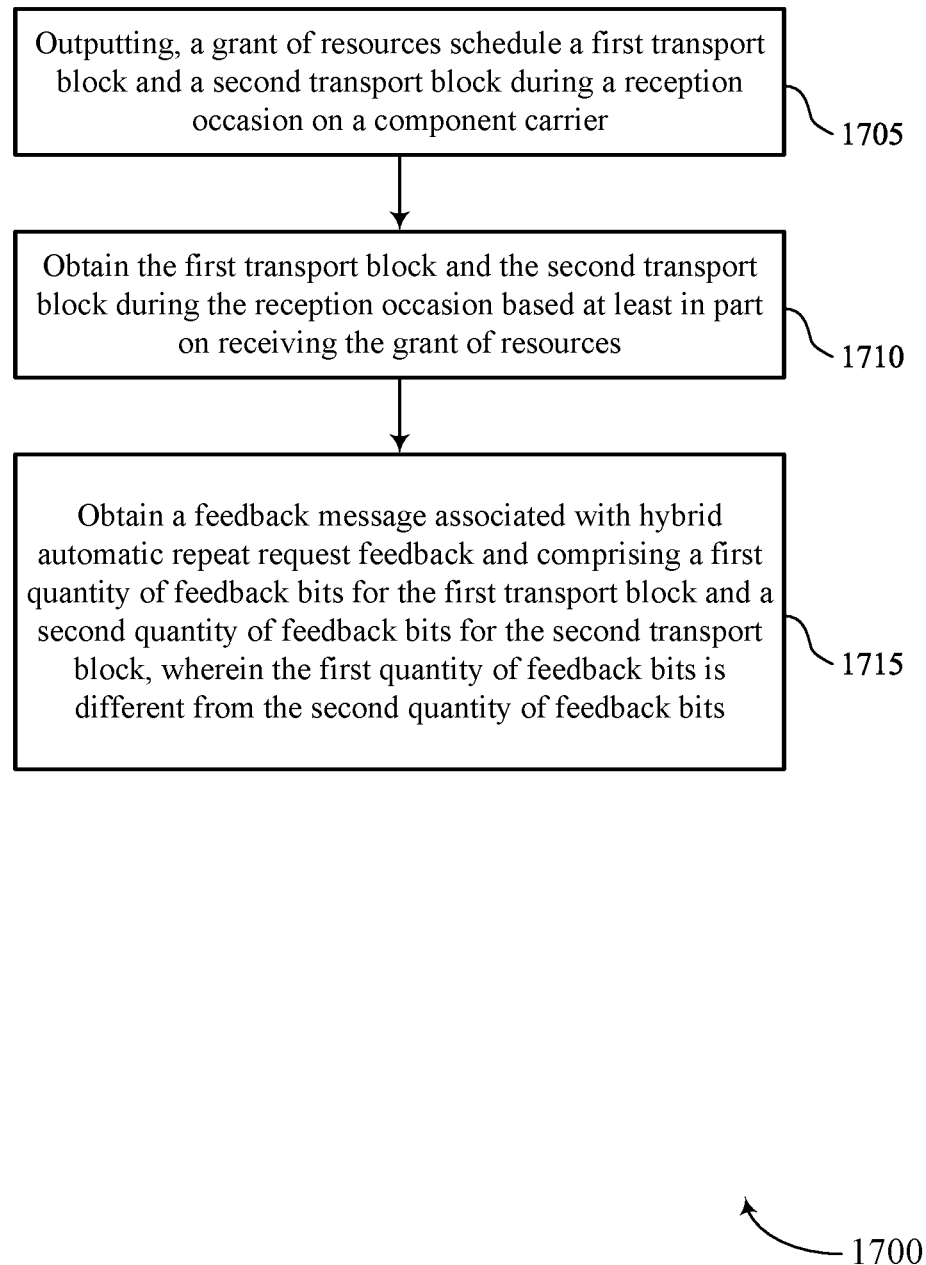

FIG. 17 shows a flowchart illustrating a method 1700 that supports CBG-based transmissions for multi-codeword channels in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting, a grant of resources scheduling a first transport block and a second transport block during a reception occasion on a component carrier. The operations of 1705 may be performed in accordance with examples as disclosed herein. In some examples, aspects of the operations of 1705 may be performed by a resource grant component 1225 as described with reference to FIG. 12.

At 1710, the method may include obtaining the first transport block and the second transport block during the reception occasion based on receiving the grant of resources. The operations of 1710 may be performed in accordance with examples as disclosed herein. In some examples, aspects of the operations of 1710 may be performed by a transport block component 1230 as described with reference to FIG. 12.

At 1715, the method may include obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits. The operations of 1715 may be performed in accordance with examples as disclosed herein. In some examples, aspects of the operations of 1715 may be performed by a feedback message component 1235 as described with reference to FIG. 12.

Figure 18:
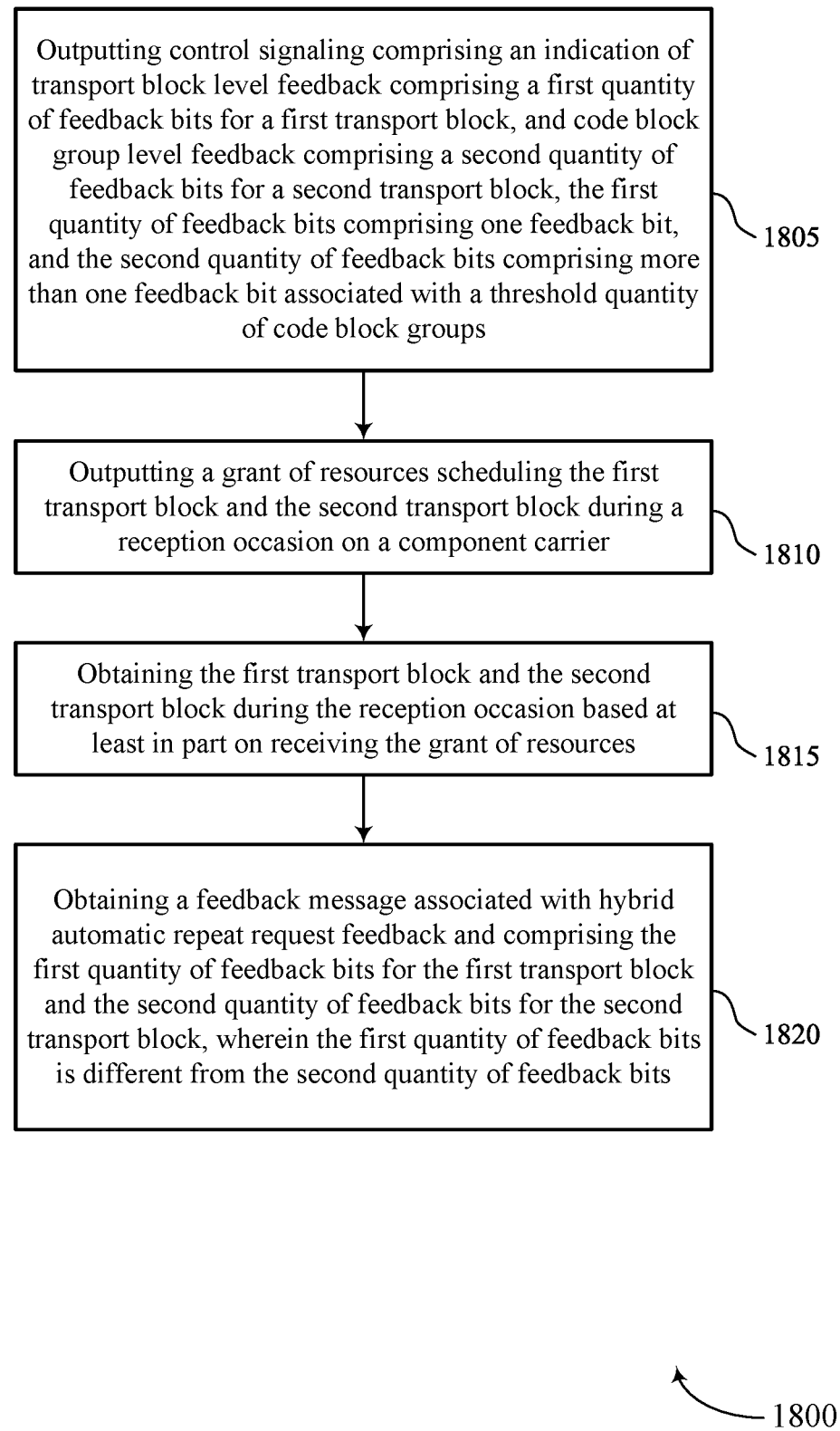

FIG. 18 shows a flowchart illustrating a method 1800 that supports CBG-based transmissions for multi-codeword channels in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include outputting control signaling including an indication of transport block level feedback including a first quantity of feedback bits for a first transport block, and CBG level feedback including a second quantity of feedback bits for a second transport block, the first quantity of feedback bits including one feedback bit, and the second quantity of feedback bits including more than one feedback bit associated with a threshold quantity of CBGs. The operations of 1805 may be performed in accordance with examples as disclosed herein. In some examples, aspects of the operations of 1805 may be performed by a feedback control signaling component 1240 as described with reference to FIG. 12.

At 1810, the method may include outputting a grant of resources scheduling the first transport block and the second transport block during a reception occasion on a component carrier. The operations of 1810 may be performed in accordance with examples as disclosed herein. In some examples, aspects of the operations of 1810 may be performed by a resource grant component 1225 as described with reference to FIG. 12.

At 1815, the method may include obtaining the first transport block and the second transport block during the reception occasion based on receiving the grant of resources. The operations of 1815 may be performed in accordance with examples as disclosed herein. In some examples, aspects of the operations of 1815 may be performed by a transport block component 1230 as described with reference to FIG. 12.

At 1820, the method may include obtaining a feedback message associated with hybrid automatic repeat request feedback and including the first quantity of feedback bits for the first transport block and the second quantity of feedback bits for the second transport block, where the first quantity of feedback bits is different from the second quantity of feedback bits. The operations of 1820 may be performed in accordance with examples as disclosed herein. In some examples, aspects of the operations of 1820 may be performed by a feedback message component 1235 as described with reference to FIG. 12.

Figure 19:
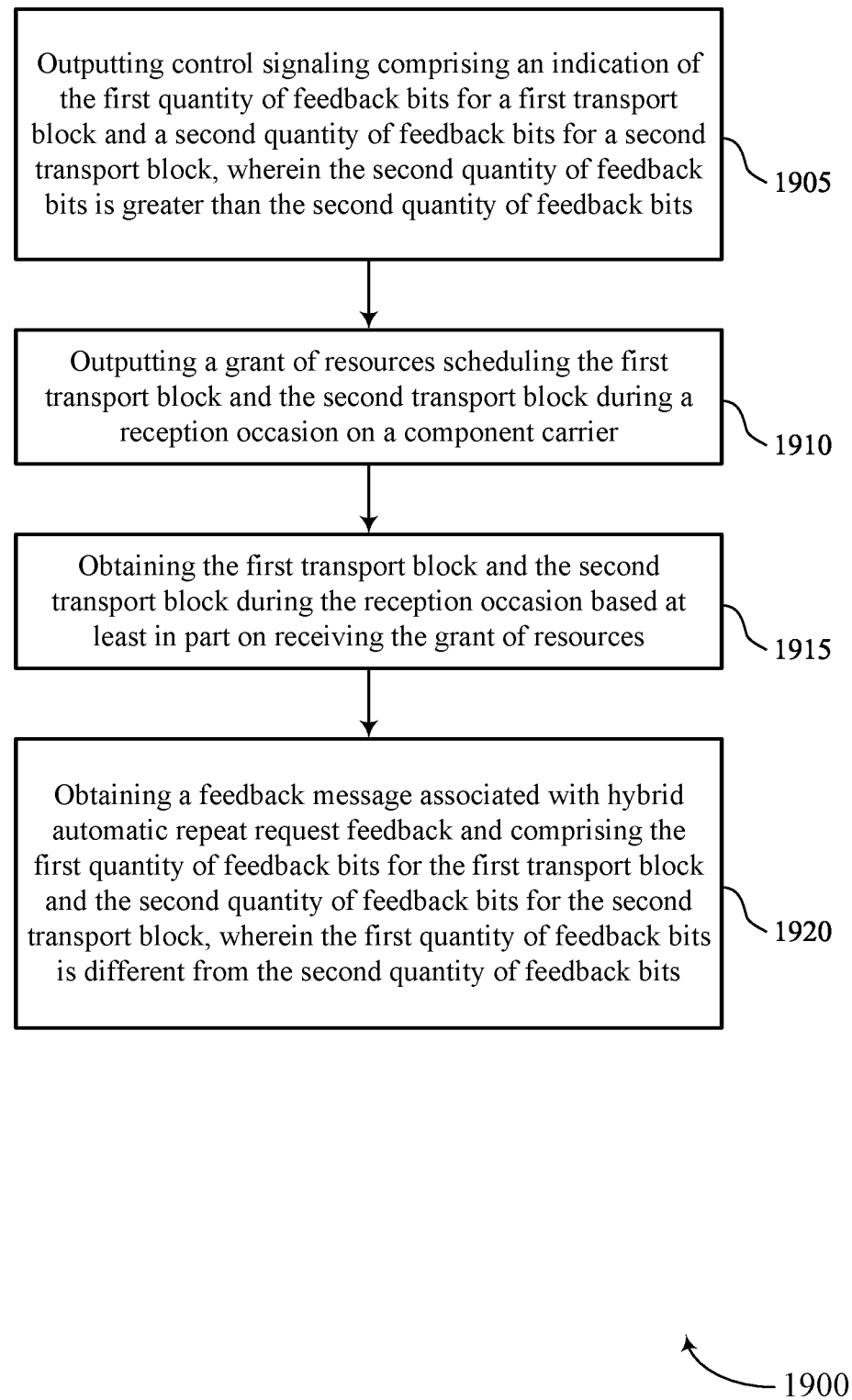

FIG. 19 shows a flowchart illustrating a method 1900 that supports CBG-based transmissions for multi-codeword channels in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include outputting a grant of resources scheduling a first transport block and a second transport block during a reception occasion on a component carrier. The operations of 1905 may be performed in accordance with examples as disclosed herein. In some examples, aspects of the operations of 1905 may be performed by a resource grant component 1225 as described with reference to FIG. 12.

At 1910, the method may include obtaining the first transport block and the second transport block during the reception occasion based on receiving the grant of resources. The operations of 1910 may be performed in accordance with examples as disclosed herein. In some examples, aspects of the operations of 1910 may be performed by a transport block component 1230 as described with reference to FIG. 12.

At 1915, the method may include obtaining a feedback message associated with hybrid automatic repeat request feedback and including a first quantity of feedback bits for the first transport block and a second quantity of feedback bits for the second transport block, where the first quantity of feedback bits is different from the second quantity of feedback bits. The operations of 1915 may be performed in accordance with examples as disclosed herein. In some examples, aspects of the operations of 1915 may be performed by a feedback message component 1235 as described with reference to FIG. 12.

At 1920, the method may include outputting control signaling including an indication of the first quantity of feedback bits for the first transport block and the second quantity of feedback bits for the second transport block, where the second quantity of feedback bits is greater than the second quantity of feedback bits. The operations of 1920 may be performed in accordance with examples as disclosed herein. In some examples, aspects of the operations of 1920 may be performed by a feedback control signaling component 1240 as described with reference to FIG. 12.

The following provides an overview of aspects of the present disclosure:

Aspect 1: A method for wireless communications at a UE, comprising: receiving a grant of resources scheduling a first transport block and a second transport block during a reception occasion on a component carrier; receiving the first transport block and the second transport block during the reception occasion; and transmitting a feedback message associated with hybrid automatic repeat request feedback and comprising a first quantity of feedback bits for the first transport block and a second quantity of feedback bits for the second transport block, wherein the first quantity of feedback bits is different from the second quantity of feedback bits.

Aspect 2: The method of aspect 1, further comprising: receiving control signaling comprising an indication of transport block level feedback comprising the first quantity of feedback bits for the first transport block, and CBG level feedback comprising the second quantity of feedback bits for the second transport block, the first quantity of feedback bits comprising one feedback bit, and the second quantity of feedback bits comprising more than one feedback bit associated with a threshold quantity of CBGs.

Aspect 3: The method of aspect 2, further comprising: mapping the first quantity of feedback bits to the first transport block and the second quantity of feedback bits to the second transport block based at least in part on a comparison between a first value of one or more parameters of the first transport block with a second value of the one or more parameters of the second transport block, the one or more parameters comprising a transport block size, a quantity of codebooks, a modulation and coding scheme, a transmission rank, an identifier order in the grant of resources, or a combination thereof.

Aspect 4: The method of any of aspects 2 through 3, further comprising: generating a first portion of the feedback message comprising the one feedback bit associated with the first transport block according to a first sub-codebook associated with transport block level feedback; and generating a second portion of the feedback message comprising the second quantity of feedback bits associated with the second transport block according to a second sub-codebook associated with CBG level feedback.

Aspect 5: The method of aspect 4, further comprising: receiving, in the grant of resources, a first set of downlink assignment indices associated with the first sub-codebook and a second set of downlink assignment indices associated with the second sub-codebook, wherein generating the first portion of the feedback message is based at least in part on the first set of downlink assignment indices and generating the second portion of the feedback message is based at least in part on the second set of downlink assignment indices.

Aspect 6: The method of any of aspects 2 through 5, further comprising: generating a first portion of the feedback message comprising the one feedback bit associated with the first transport block and the second quantity of feedback bits associated with the second transport block according to a first sub-codebook with CBG level feedback.

Aspect 7: The method of aspect 6, further comprising: receiving, in the grant of resources, a set of downlink assignment indices for the first sub-codebook and a second sub-codebook with transport block level feedback, wherein each downlink assignment index position associated with a respective downlink assignment index of the set of downlink assignment indices is associated with a quantity of feedback bits greater than or equal to a sum of the first quantity of feedback bits and the second quantity of feedback bits.

Aspect 8: The method of aspect 7, wherein each downlink assignment index position associated with a respective downlink assignment index of the set of downlink assignment indices is associated with the quantity of feedback bits that is based at least in part on a threshold quantity of feedback bits supported across a plurality of component carriers comprising the component carrier.

Aspect 9: The method of any of aspects 1 through 8, further comprising: generating the feedback message according to a feedback codebook comprising a total quantity of feedback bits corresponding to a plurality of reception occasions on the component carrier.

Aspect 10: The method of aspect 9, wherein each of the plurality of reception occasions corresponds to a subset of the total quantity of feedback bits equal to a product of two and a threshold quantity of CBGs.

Aspect 11: The method of any of aspects 9 through 10, wherein each of the plurality of reception occasions corresponds to a subset of the total quantity of feedback bits equal to a sum of the first quantity of feedback bits and the second quantity of feedback bits.

Aspect 12: The method of any of aspects 1 through 11, further comprising: generating the feedback message according to a feedback codebook comprising a total quantity of feedback bits corresponding to a plurality of feedback process identifiers, wherein each of the plurality of feedback process identifiers corresponds to a subset of the total quantity of feedback bits equal to a sum of the first quantity of feedback bits and the second quantity of feedback bits.

Aspect 13: The method of any of aspects 1 through 12, further comprising: receiving control signaling comprising an indication of the first quantity of feedback bits for the first transport block and the second quantity of feedback bits for the second transport block, wherein the second quantity of feedback bits is greater than the second quantity of feedback bits.

Aspect 14: The method of aspect 13, further comprising: mapping the first quantity of feedback bits to the first transport block and the second quantity of feedback bits to the second transport block based at least in part on a comparison between a value of one or more parameters of the first transport block with a respective value of the one or more parameters of the second transport block, the one or more parameters comprising a transport block size, a quantity of codebooks, a modulation and coding scheme, a transmission rank, an identifier order in the grant of resources, or a combination thereof.

Aspect 15: The method of any of aspects 13 through 14, further comprising: generating a first portion of the feedback message comprising the first quantity of feedback bits associated with the first transport block and the second quantity of feedback bits associated with the second transport block according to a sub-codebook with CBG level feedback.

Aspect 16: The method of aspect 15, further comprising: receiving, in the grant of resources, a set of downlink assignment indices for the sub-codebook, wherein each downlink assignment index position associated with a respective downlink assignment index of the set of downlink assignment indices is associated with a quantity of feedback bits equal to a sum of the first quantity of feedback bits and the second quantity of feedback bits.

Aspect 17: A method for wireless communications at a network entity, comprising: outputting, a grant of resources scheduling a first transport block and a second transport block during a reception occasion on a component carrier; obtaining the first transport block and the second transport block during the reception occasion based at least in part on receiving the grant of resources; and obtaining a feedback message associated with hybrid automatic repeat request feedback and comprising a first quantity of feedback bits for the first transport block and a second quantity of feedback bits for the second transport block, wherein the first quantity of feedback bits is different from the second quantity of feedback bits.

Aspect 18: The method of aspect 17, further comprising: outputting control signaling comprising an indication of transport block level feedback comprising the first quantity of feedback bits for the first transport block, and CBG level feedback comprising the second quantity of feedback bits for the second transport block, the first quantity of feedback bits comprising one feedback bit, and the second quantity of feedback bits comprising more than one feedback bit associated with a threshold quantity of CBGs.

Aspect 19: The method of aspect 18, further comprising: decoding a first portion of the feedback message comprising the one feedback bit associated with the first transport block according to a first sub-codebook associated with transport block level feedback; and decoding a second portion of the feedback message comprising the second quantity of feedback bits associated with the second transport block according to a second sub-codebook associated with CBG level feedback.

Aspect 20: The method of aspect 19, further comprising: outputting, in the grant of resources, a first set of downlink assignment indices associated with the first sub-codebook and a second set of downlink assignment indices associated with the second sub-codebook, wherein decoding the first portion of the feedback message is based at least in part on the first set of downlink assignment indices and decoding the second portion of the feedback message is based at least in part on the second set of downlink assignment indices.

Aspect 21: The method of any of aspects 18 through 20, further comprising: decoding a first portion of the feedback message comprising the one feedback bit associated with the first transport block and the second quantity of feedback bits associated with the second transport block according to a first sub-codebook with CBG level feedback.

Aspect 22: The method of aspect 21, further comprising: outputting, in the grant of resources, a set of downlink assignment indices for the first sub-codebook and a second sub-codebook with transport block level feedback, wherein each downlink assignment index position associated with a respective downlink assignment index of the set of downlink assignment indices is associated with a quantity of feedback bits greater than or equal to a sum of the first quantity of feedback bits and the second quantity of feedback bits.

Aspect 23: The method of aspect 22, wherein each downlink assignment index position associated with a respective downlink assignment index of the set of downlink assignment indices is associated with the quantity of feedback bits that is based at least in part on a threshold quantity of feedback bits supported across a plurality of component carriers comprising the component carrier.

Aspect 24: The method of any of aspects 17 through 23, further comprising: outputting control signaling comprising an indication of the first quantity of feedback bits for the first transport block and the second quantity of feedback bits for the second transport block, wherein the second quantity of feedback bits is greater than the second quantity of feedback bits.

Aspect 25: The method of aspect 24, further comprising: decoding a first portion of the feedback message comprising the first quantity of feedback bits associated with the first transport block and the second quantity of feedback bits associated with the second transport block according to a sub-codebook with CBG level feedback.

Aspect 26: The method of aspect 25, further comprising: outputting, in the grant of resources, a set of downlink assignment indices for the sub-codebook, wherein each downlink assignment index position associated with a respective downlink assignment index of the set of downlink assignment indices is associated with a quantity of feedback bits equal to a sum of the first quantity of feedback bits and the second quantity of feedback bits.

Aspect 27: An apparatus for wireless communications at a UE, comprising a processor; memory coupled with the processor; and instructions stored in the memory and executable by the processor to cause the apparatus to perform a method of any of aspects 1 through 16.

Aspect 28: An apparatus for wireless communications at a UE, comprising at least one means for performing a method of any of aspects 1 through 16.

Aspect 29: A non-transitory computer-readable medium storing code for wireless communications at a UE, the code comprising instructions executable by a processor to perform a method of any of aspects 1 through 16.

Aspect 30: An apparatus for wireless communications at a network entity, comprising a processor; memory coupled with the processor; and instructions stored in the memory and executable by the processor to cause the apparatus to perform a method of any of aspects 17 through 26.

Aspect 31: An apparatus for wireless communications at a network entity, comprising at least one means for performing a method of any of aspects 17 through 26.

Aspect 32: A non-transitory computer-readable medium storing code for wireless communications at a network entity, the code comprising instructions executable by a processor to perform a method of any of aspects 17 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving control signaling comprising:
      an indication of transport block level feedback comprising a first quantity of feedback bits comprising one feedback bit for a first transport block, and
      an indication of code block group level feedback comprising a second quantity of feedback bits for a second transport block, the second quantity of feedback bits comprising more than one feedback bit associated with a threshold quantity of code block groups;
   receiving a grant of resources scheduling the first transport block and the second transport block during a reception occasion on a component carrier;
   receiving the first transport block and the second transport block during the reception occasion; and
   transmitting a feedback message associated with hybrid automatic repeat request feedback and comprising the first quantity of feedback bits for the first transport block and the second quantity of feedback bits for the second transport block, wherein the first quantity of feedback bits is different from the second quantity of feedback bits.

2. The method of claim 1, further comprising:
   mapping the first quantity of feedback bits to the first transport block and the second quantity of feedback bits to the second transport block based at least in part on a comparison between a first value of one or more parameters of the first transport block with a second value of the one or more parameters of the second transport block, the one or more parameters comprising a transport block size, a quantity of codebooks, a modulation and coding scheme, a transmission rank, an identifier order in the grant of resources, or a combination thereof.

3. The method of claim 1, further comprising:
   generating a first portion of the feedback message comprising the one feedback bit associated with the first transport block according to a first sub-codebook associated with the transport block level feedback; and
   generating a second portion of the feedback message comprising the second quantity of feedback bits associated with the second transport block according to a second sub- codebook associated with the code block group level feedback.

4. The method of claim 3, further comprising:
   receiving, in the grant of resources, a first set of downlink assignment indices associated with the first sub-codebook and a second set of downlink assignment indices associated with the second sub-codebook, wherein generating the first portion of the feedback message is based at least in part on the first set of downlink assignment indices and generating the second portion of the feedback message is based at least in part on the second set of downlink assignment indices.

5. The method of claim 1, further comprising:
   generating a first portion of the feedback message comprising the one feedback bit associated with the first transport block and the second quantity of feedback bits associated with the second transport block according to a first sub-codebook with the code block group level feedback.

6. The method of claim 5, further comprising:
   receiving, in the grant of resources, a set of downlink assignment indices for the first sub-codebook and a second sub-codebook with transport block level feedback, wherein each downlink assignment index position associated with a respective downlink assignment index of the set of downlink assignment indices is associated with a quantity of feedback bits greater than or equal to a sum of the first quantity of feedback bits and the second quantity of feedback bits.

7. The method of claim 6, wherein each downlink assignment index position associated with a respective downlink assignment index of the set of downlink assignment indices is associated with the quantity of feedback bits that is based at least in part on a threshold quantity of feedback bits supported across a plurality of component carriers comprising the component carrier.

8. The method of claim 1, further comprising:
generating the feedback message according to a feedback codebook comprising a total quantity of feedback bits corresponding to a plurality of reception occasions on the component carrier.

9. The method of claim 8, wherein each of the plurality of reception occasions corresponds to a subset of the total quantity of feedback bits equal to a product of two and a threshold quantity of code block groups.

10. The method of claim 8, wherein each of the plurality of reception occasions corresponds to a subset of the total quantity of feedback bits equal to a sum of the first quantity of feedback bits and the second quantity of feedback bits.

11. The method of claim 1, further comprising:
generating the feedback message according to a feedback codebook comprising a total quantity of feedback bits corresponding to a plurality of feedback process identifiers, wherein each of the plurality of feedback process identifiers corresponds to a subset of the total quantity of feedback bits equal to a sum of the first quantity of feedback bits and the second quantity of feedback bits.

12. The method of claim 1, further comprising:
mapping the first quantity of feedback bits to the first transport block and the second quantity of feedback bits to the second transport block based at least in part on a comparison between a value of one or more parameters of the first transport block with a respective value of the one or more parameters of the second transport block, the one or more parameters comprising a transport block size, a quantity of codebooks, a modulation and coding scheme, a transmission rank, an identifier order in the grant of resources, or a combination thereof.

13. The method of claim 1, further comprising:
generating a first portion of the feedback message comprising the first quantity of feedback bits associated with the first transport block and the second quantity of feedback bits associated with the second transport block according to a sub-codebook with the code block group level feedback.

14. The method of claim 13, further comprising:
receiving, in the grant of resources, a set of downlink assignment indices for the sub-codebook, wherein each downlink assignment index position associated with a respective downlink assignment index of the set of downlink assignment indices is associated with a quantity of feedback bits equal to a sum of the first quantity of feedback bits and the second quantity of feedback bits.

15. A method for wireless communications at a network entity, comprising:
outputting control signaling comprising:
an indication of transport block level feedback comprising a first quantity of feedback bits comprising one feedback bit for a first transport block, and
an indication of code block group level feedback comprising a second quantity of feedback bits for a second transport block, the second quantity of feedback bits comprising more than one feedback bit associated with a threshold quantity of code block groups;
outputting a grant of resources scheduling the first transport block and the second transport block during a reception occasion on a component carrier;
outputting the first transport block and the second transport block during the reception occasion based at least in part on receiving the grant of resources; and
obtaining a feedback message associated with hybrid automatic repeat request feedback and comprising the first quantity of feedback bits for the first transport block and the second quantity of feedback bits for the second transport block, wherein the first quantity of feedback bits is different from the second quantity of feedback bits.

16. The method of claim 15, further comprising:
decoding a first portion of the feedback message comprising the one feedback bit associated with the first transport block according to a first sub-codebook associated with the transport block level feedback; and
decoding a second portion of the feedback message comprising the second quantity of feedback bits associated with the second transport block according to a second sub-codebook associated with the code block group level feedback.

17. The method of claim 16, further comprising:
outputting, in the grant of resources, a first set of downlink assignment indices associated with the first sub-codebook and a second set of downlink assignment indices associated with the second sub-codebook, wherein decoding the first portion of the feedback message is based at least in part on the first set of downlink assignment indices and decoding the second portion of the feedback message is based at least in part on the second set of downlink assignment indices.

18. The method of claim 15, further comprising:
decoding a first portion of the feedback message comprising the one feedback bit associated with the first transport block and the second quantity of feedback bits associated with the second transport block according to a first sub-codebook with the code block group level feedback.

19. The method of claim 18, further comprising:
outputting, in the grant of resources, a set of downlink assignment indices for the first sub-codebook and a second sub-codebook with transport block level feedback, wherein each downlink assignment index position associated with a respective downlink assignment index of the set of downlink assignment indices is associated with a quantity of feedback bits greater than or equal to a sum of the first quantity of feedback bits and the second quantity of feedback bits.

20. The method of claim 19, wherein each downlink assignment index position associated with a respective downlink assignment index of the set of downlink assignment indices is associated with the quantity of feedback bits that is based at least in part on a threshold quantity of feedback bits supported across a plurality of component carriers comprising the component carrier.

21. The method of claim 15, further comprising:
decoding a first portion of the feedback message comprising the first quantity of feedback bits associated with the first transport block and the second quantity of feedback bits associated with the second transport block according to a sub-codebook with the code block group level feedback.

22. The method of claim 21, further comprising:
outputting, in the grant of resources, a set of downlink assignment indices for the sub-codebook, wherein each downlink assignment index position associated with a respective downlink assignment index of the set of downlink assignment indices is associated with a quantity of feedback bits equal to a sum of the first quantity of feedback bits and the second quantity of feedback bits.

23. An apparatus for wireless communications at a user equipment (UE), comprising:
a processor;
memory coupled with the processor; and
instructions stored in the memory and executable by the processor to cause the apparatus to:
receive control signaling comprising:
an indication of transport block level feedback comprising a first quantity of feedback bits comprising one feedback bit for a first transport block, and
an indication of code block group level feedback comprising a second quantity of feedback bits for a second transport block, the second quantity of feedback bits comprising more than one feedback bit associated with a threshold quantity of code block groups;
receive a grant of resources scheduling the first transport block and the second transport block during a reception occasion on a component carrier;
receive the first transport block and the second transport block during the reception occasion; and
transmit a feedback message associated with hybrid automatic repeat request feedback and comprising the first quantity of feedback bits for the first transport block and the second quantity of feedback bits for the second transport block, wherein the first quantity of feedback bits is different from the second quantity of feedback bits.

24. An apparatus for wireless communications at a 30. network entity, comprising:
a processor;
memory coupled with the processor; and
instructions stored in the memory and executable by the processor to cause the apparatus to:
output control signaling comprising:
an indication of transport block level feedback comprising a first quantity of feedback bits comprising one feedback bit for a first transport block, and
an indication of code block group level feedback comprising a second quantity of feedback bits for a second transport block, the second quantity of feedback bits comprising more than one feedback bit associated with a threshold quantity of code block groups;
output a grant of resources scheduling the first transport block and the second transport block during a reception occasion on a component carrier;
output the first transport block and the second transport block during the reception occasion based at least in part on receiving the grant of resources; and
obtain a feedback message associated with hybrid automatic repeat request feedback and comprising a first quantity of feedback bits for the first transport block and a second quantity of feedback bits for the second transport block, wherein the first quantity of feedback bits is different from the second quantity of feedback bits.

\* \* \* \* \*